US006935511B2

(12) United States Patent
Seyffert et al.

(10) Patent No.: US 6,935,511 B2
(45) Date of Patent: Aug. 30, 2005

(54) CENTRALLY SUPPORTED SCREEN ASSEMBLY

(75) Inventors: Kenneth W. Seyffert, Houston, TX (US); George Alexander Burnett, Aberdeen (GB); Guy L. McClung, III, Spring, TX (US)

(73) Assignee: Varco I/P, Inc., Houston, TX (US)

( * ) Notice: Subject to any disclaimer, the term of this patent is extended or adjusted under 35 U.S.C. 154(b) by 172 days.

(21) Appl. No.: 10/429,263

(22) Filed: May 2, 2003

(65) Prior Publication Data

US 2004/0074816 A1 Apr. 22, 2004

Related U.S. Application Data

(63) Continuation-in-part of application No. 10/418,743, filed on Apr. 21, 2003.

(30) Foreign Application Priority Data

Oct. 17, 2002 (GB) .............................................. 0224156
Jan. 23, 2003 (GB) .............................................. 0301508
Jan. 23, 2003 (GB) .............................................. 0301509

(51) Int. Cl.[7] ............................. B07B 1/48; B01D 33/00
(52) U.S. Cl. ...................... 209/404; 209/405; 209/408; 209/413; 210/386; 210/388
(58) Field of Search ............................... 209/398, 399, 209/404, 405, 408, 409, 412, 413; 210/384, 386, 388, 499

(56) References Cited

U.S. PATENT DOCUMENTS

| 2,774,477 A | 12/1956 | Pollitz |
| 3,256,992 A | 6/1966 | Eiling |
| 4,040,951 A | * 8/1977 | Cole ........................... 209/408 |
| 4,224,146 A | * 9/1980 | Kent et al. ................... 209/243 |
| 4,575,421 A | 3/1986 | Derrick et al. |
| 4,582,597 A | 4/1986 | Huber |
| 4,809,791 A | 3/1989 | Hayatdavoudi |
| 5,265,730 A | 11/1993 | Norris et al. |
| 5,361,911 A | 11/1994 | Waites, Sr. et al. |
| 5,615,776 A | * 4/1997 | Bjorklund et al. .......... 209/403 |
| 5,816,413 A | 10/1998 | Boccabella et al. |
| 5,971,159 A | 10/1999 | Leone et al. ................. 209/399 |
| 2002/0043485 A1 | 4/2002 | Schulte et al. |

FOREIGN PATENT DOCUMENTS

| AU | 199850301 B2 | 6/1998 |
| AU | 199896986 B2 | 8/1998 |
| AU | 199941160 A1 | 7/1999 |
| DE | 19850612 | 6/2000 |
| EP | 0202863 A2 | 5/1986 |
| EP | 0218315 A2 | 6/1986 |
| EP | 1002588 A1 | 2/1997 |
| GB | 1526663 | 4/1977 |
| GB | 1578948 | 10/1977 |
| GB | 2176424 A | 6/1986 |

(Continued)

OTHER PUBLICATIONS

PCT/GB03/03444 Int'l Search Report, 5 pages; Nov. 28, 2003.

*Primary Examiner*—Donald P. Walsh
*Assistant Examiner*—Joseph C Rodriguez
(74) *Attorney, Agent, or Firm*—Guy McClung

(57) ABSTRACT

A vibratory separator having a basket with a first side spaced-apart from a second side, screen assembly apparatus mounted in the basket, the screen assembly apparatus having a central portion, a first screen side and a second screen side, central support apparatus connected to the basket and positioned beneath and in contact with the central portion of the screen assembly apparatus, and pressing apparatus on the first side and second side of the basket for pressing down on the first screen side and on the second screen side of the screen assembly apparatus so that the central portion of the screen assembly apparatus is higher than the first screen side and the second screen side.

15 Claims, 24 Drawing Sheets

FOREIGN PATENT DOCUMENTS

| | | |
|---|---|---|
| GB | 2176425 A | 6/1986 |
| GB | 2 176 424 A | 12/1986 |
| GB | 2206501 A | 7/1987 |
| GB | 2312858 A | 3/1997 |
| WO | WO 94 23849 | 4/1994 |
| WO | WO 96/33792 | 4/1996 |
| WO | WO 97/28906 | 2/1997 |
| WO | WO 98/16328 | 10/1997 |
| WO | WO 01/76719 | 4/2001 |
| WO | WO 01/97947 | 5/2001 |
| WO | WO 03/013690 | 8/2002 |

* cited by examiner

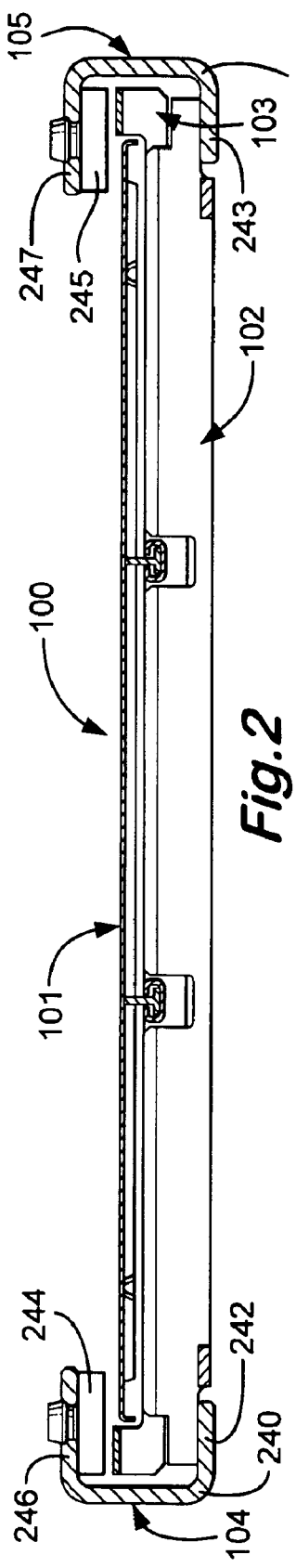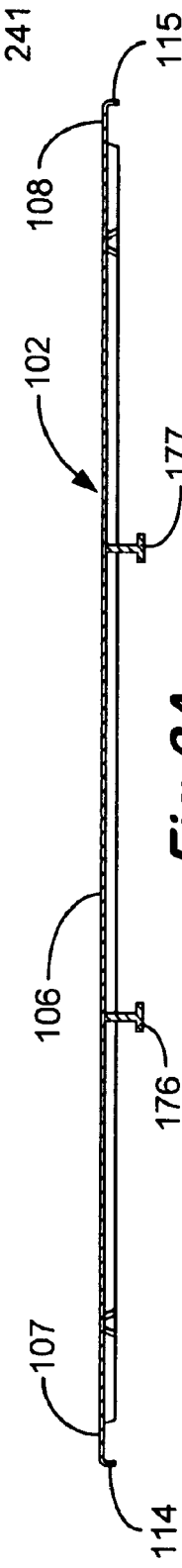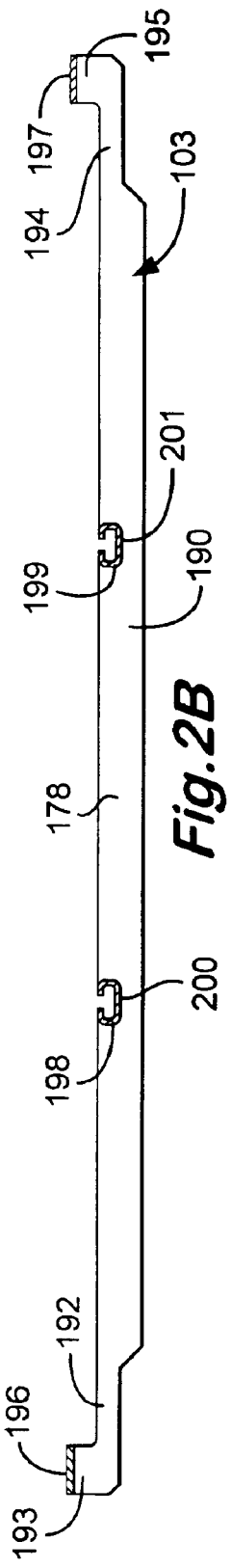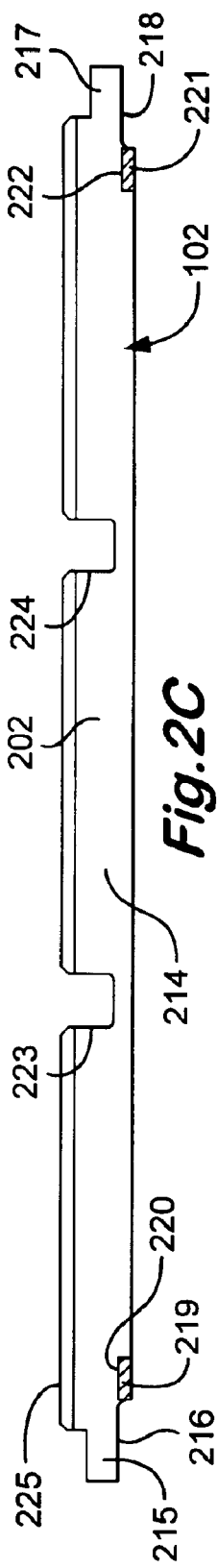

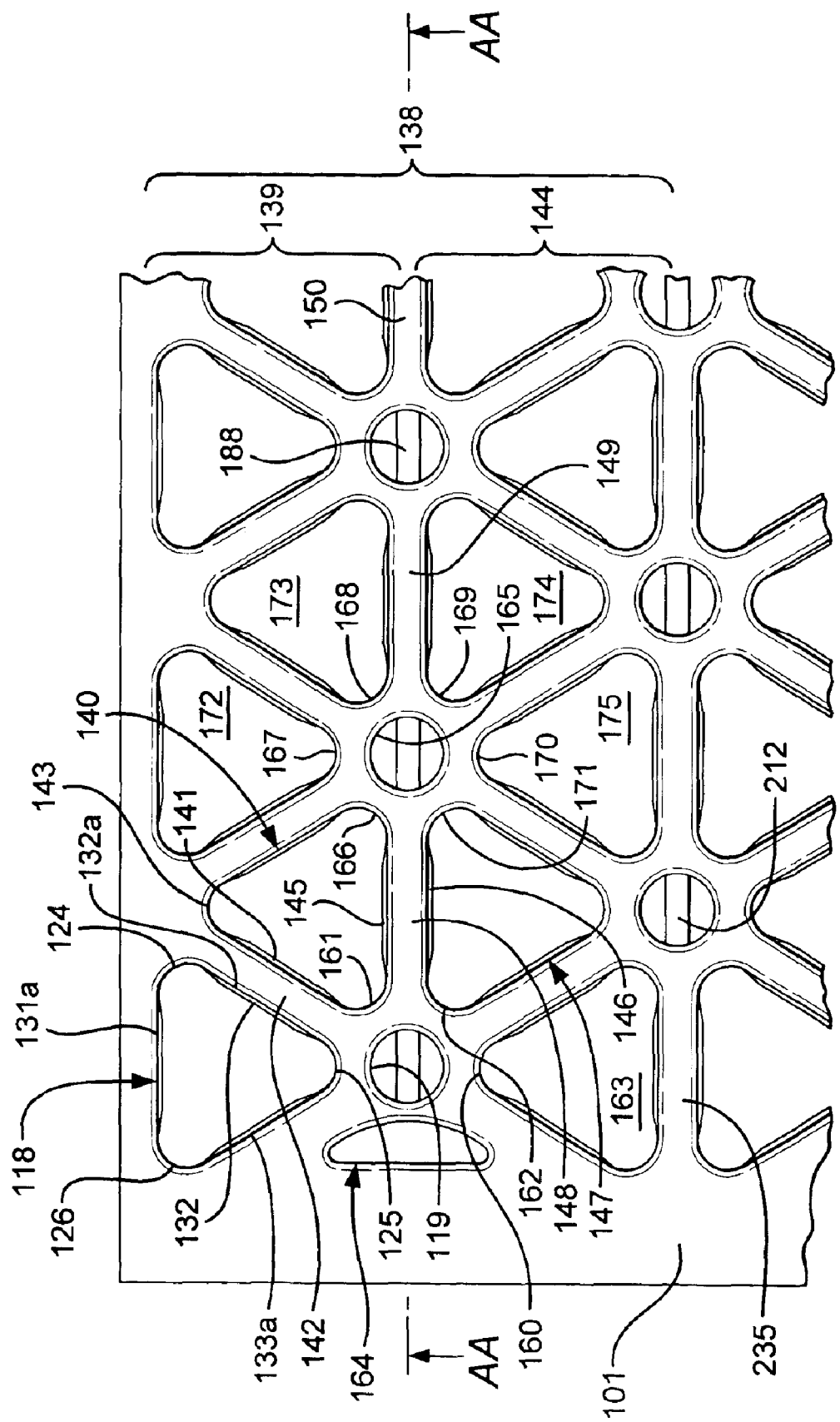

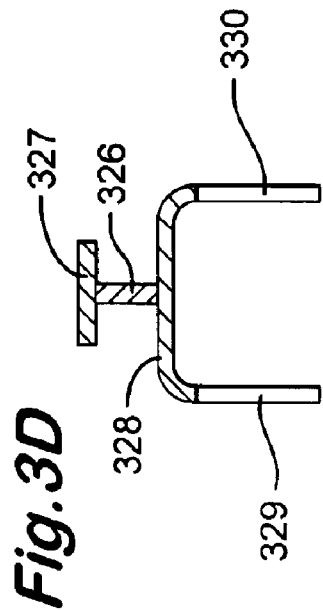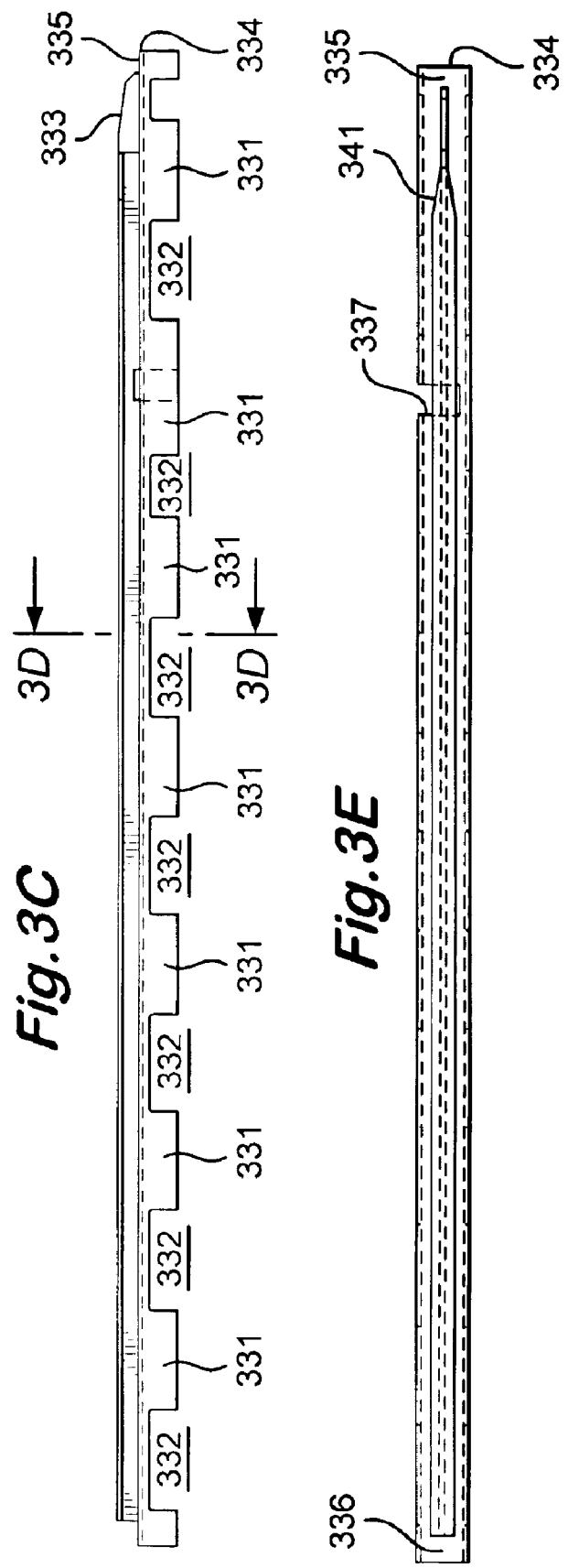

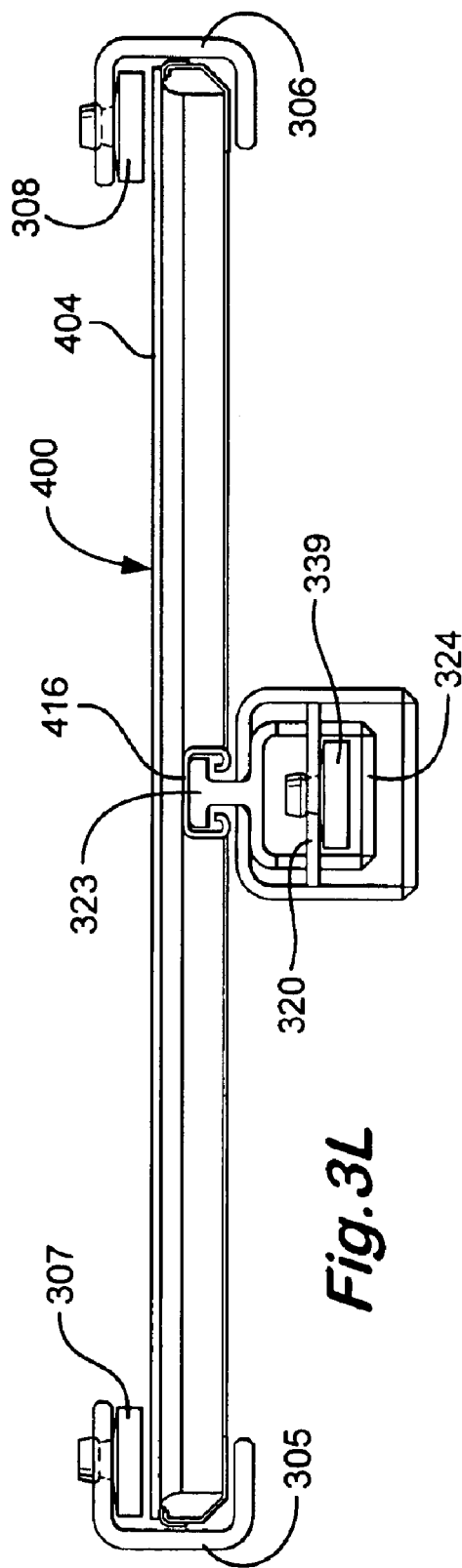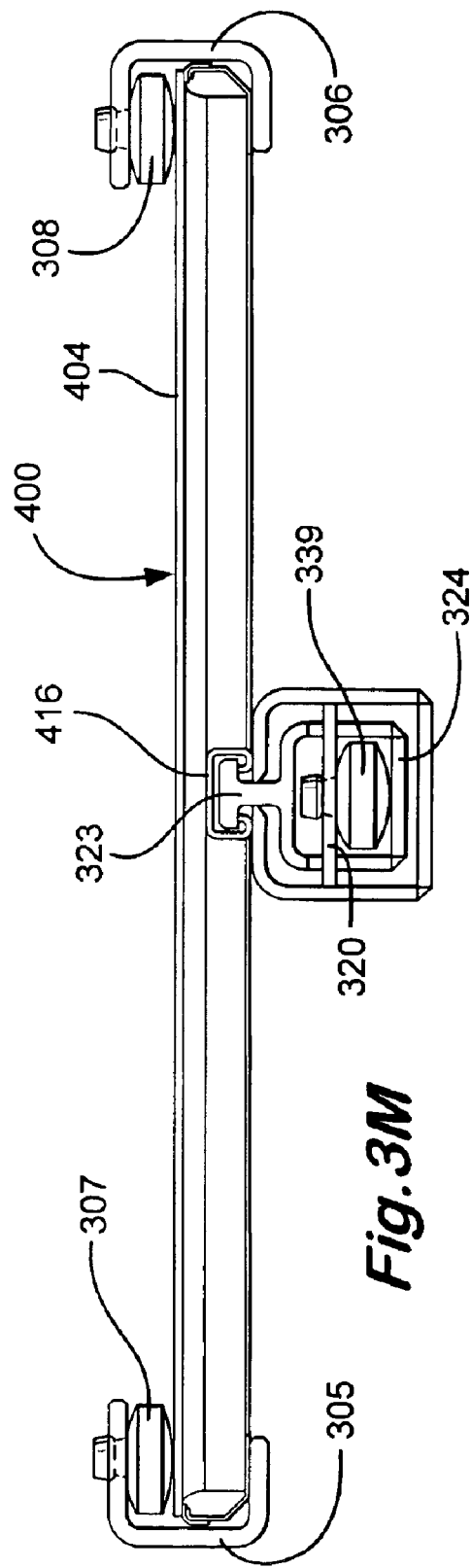

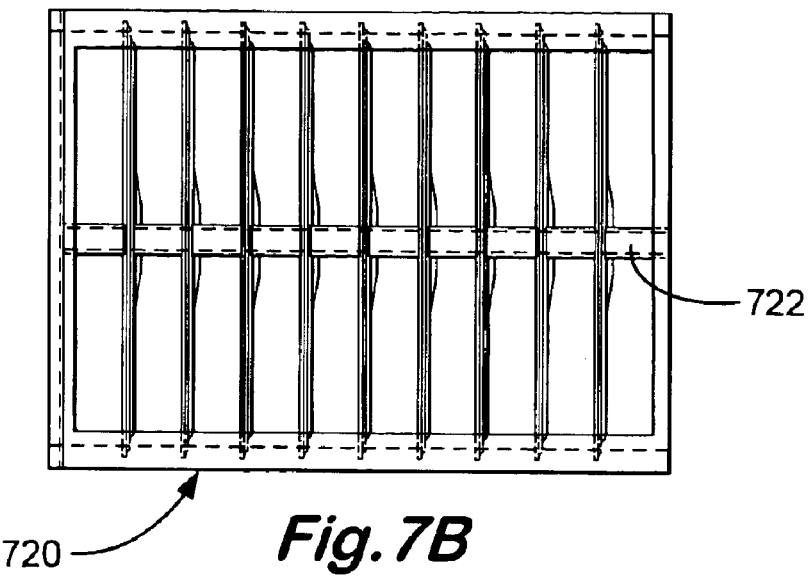
Fig. 7B
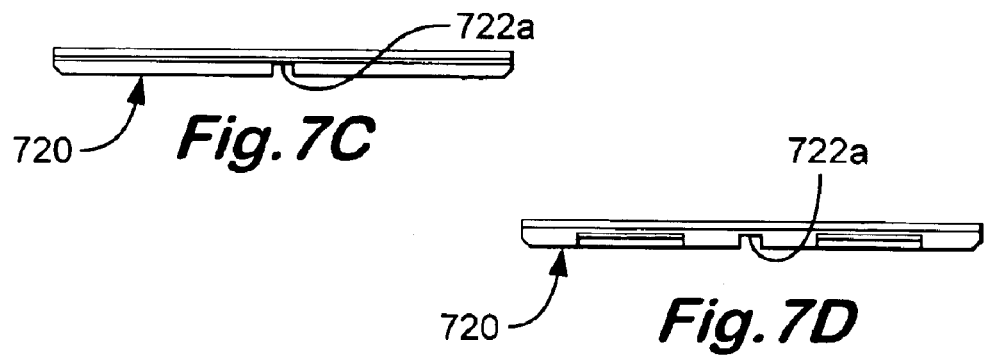
Fig. 7C
Fig. 7D
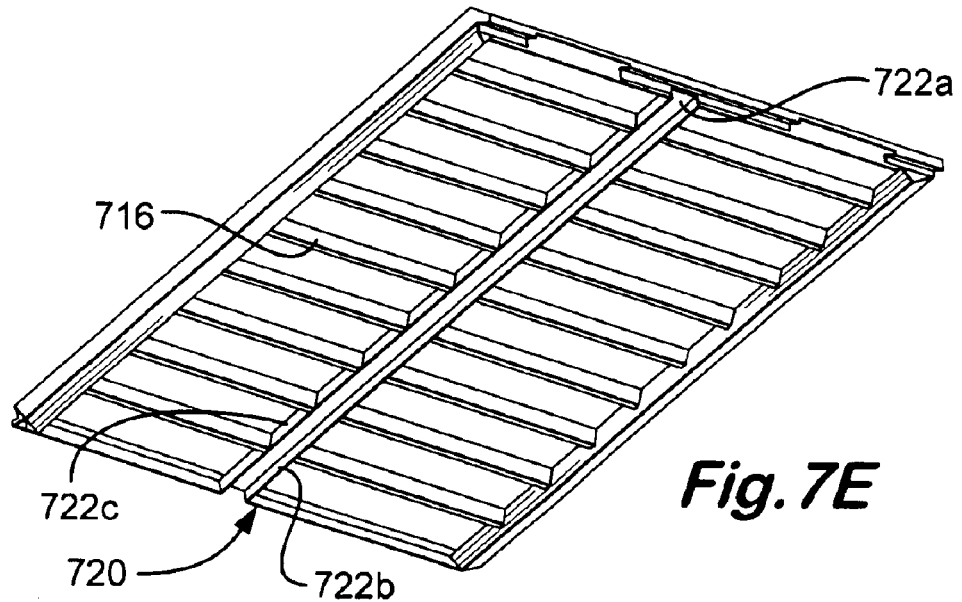
Fig. 7E

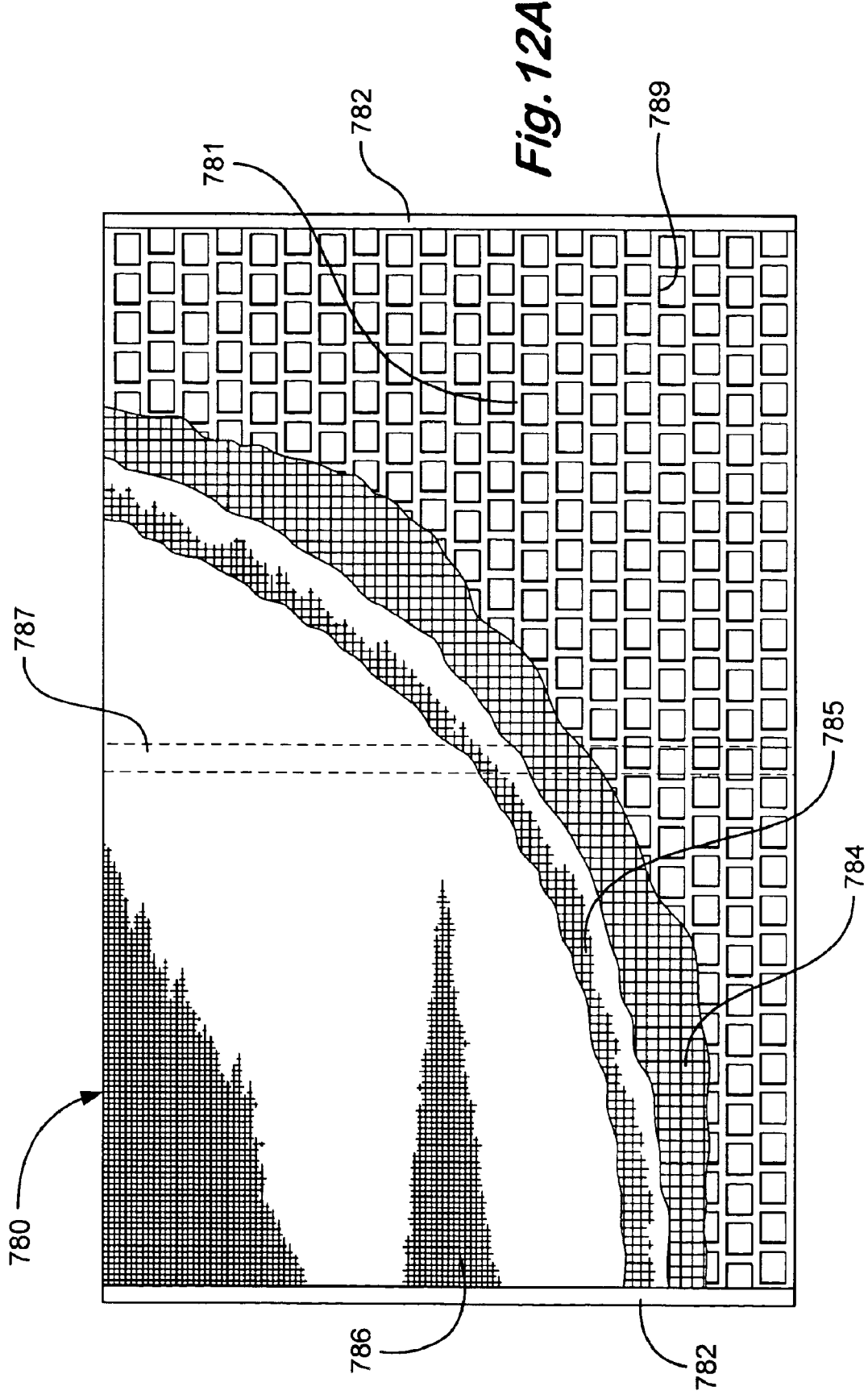

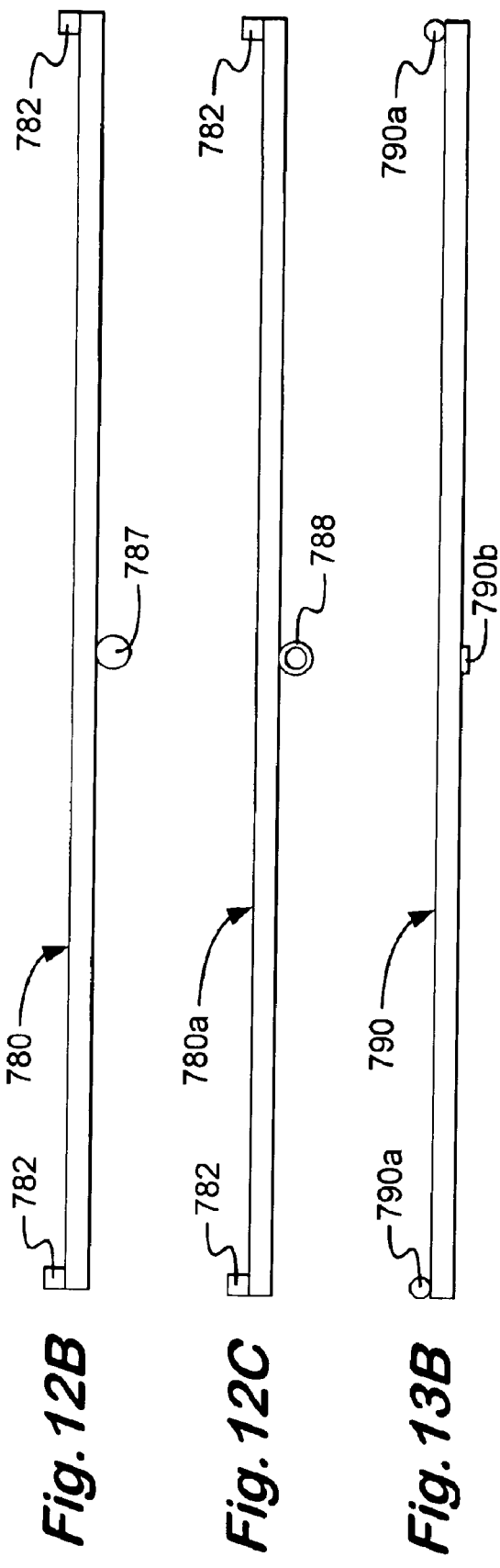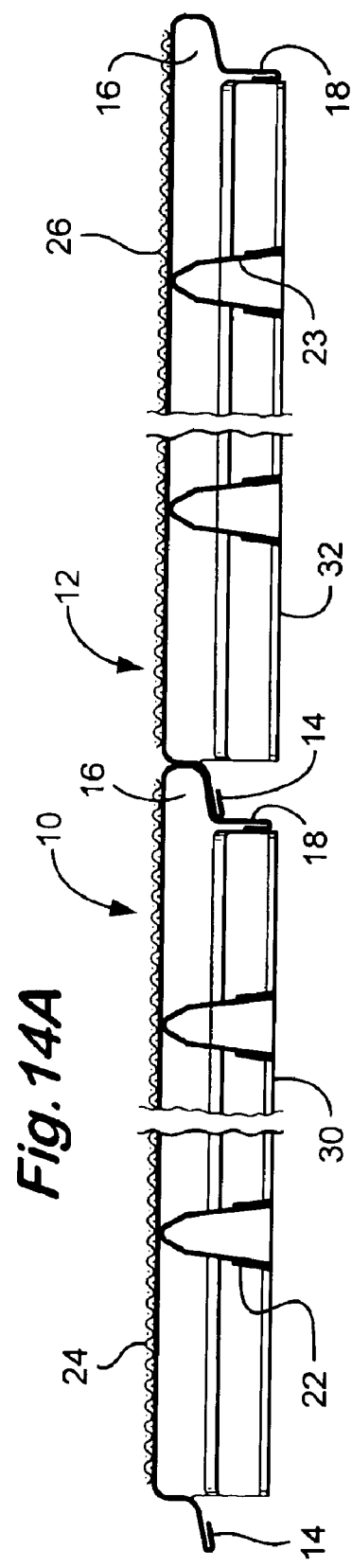

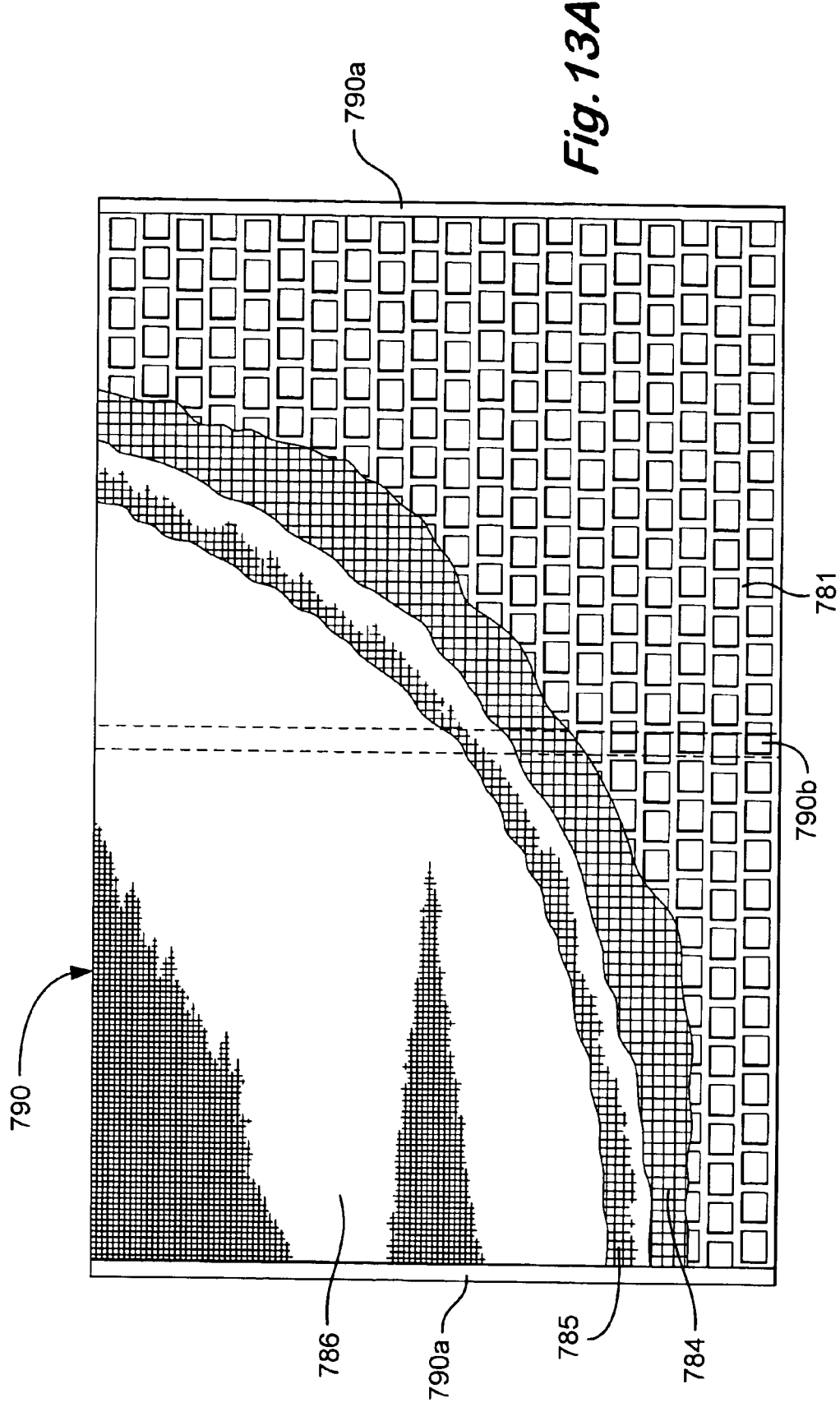

CENTRALLY SUPPORTED SCREEN ASSEMBLY

RELATED APPLICATIONS

This is a continuation-in-part of U.S. application Ser. No. 10/418,743 filed 21 Apr. 2003 entitled "Vibratory Separator And Screen Assembly" naming George Alexander Burnett as inventor which is co-owned with the present invention and which is fully incorporated herein for all purposes.

BACKGROUND OF THE INVENTION

1. Field of the Invention

The present invention relates to a vibratory separator, a screen assembly for a vibratory separator and a method for fitting a screen assembly into a vibratory separator.

2. Description of Related Art

In the drilling of a borehole in the construction of an oil or gas well, a drill bit is arranged on the end of a drill string and is rotated to bore the borehole. A drilling fluid or "drilling mud" is pumped through the drill string to the drill bit to lubricate the drill bit. The drilling mud is also used to carry the cuttings produced by the drill bit and other solids to the surface through an annulus formed between the drill string and the borehole. The drilling mud often contains expensive synthetic oil-based lubricants and it is normal therefore to recover and re-use the used drilling mud, but this requires the solids to be removed from the drilling mud. This is achieved by processing the drilling fluid. The first part of the process is to separate the solids from the solids laden drilling mud. This is at least partly achieved with a vibratory separator, such as those shale shakers disclosed in U.S. Pat. No. 5,265,730, WO 96/33792 and WO 98/16328.

Shale shakers generally comprise an open bottomed basket having one open discharge end and a solid walled feed end. A number of rectangular screens are arranged in the basket, which are held in C-channel rails located on the basket walls, such as those disclosed in GB-A-2,176,424. The basket is arranged on springs above a receptor for receiving recovered drilling mud. A skip or ditch is provided beneath the open discharge end of the basket. A motor is fixed to the basket, which has a drive rotor provided with an offset clump weight. In use, the motor rotates the rotor and the offset clump weight, which causes the basket and the screens fixed thereto to shake. Solids laden mud is introduced at the feed end of the basket on to the screens. The shaking motion induces the solids to move along the screens towards the open discharge end. The recovered drilling mud is received in the receptor for further processing and the solids pass over the discharge end of the basket into the ditch or skip.

The screens are generally of one of two types: hook-strip; and pre-tensioned.

The hook-strip type of screen comprises several rectangular layers of mesh in a sandwich, usually comprising one or two layers of fine grade mesh and a supporting mesh having larger mesh holes and heavier gauge wire. The layers of mesh are joined at each side edge by a strip which is in the form of an elongate hook. In use, the elongate hook is hooked on to a tensioning device arranged along each side of a shale shaker. The shale shaker further comprises a crowned set of supporting members, which run along the length of the basket of the shaker, over which the layers of mesh are tensioned. An example of this type of screen is disclosed in GB-A-1,526,663. The supporting mesh may be provided with or replaced by a panel having apertures therein.

The pre-tensioned type of screen comprises several rectangular layers of mesh, usually comprising one or two layers of fine grade mesh and a supporting mesh having larger mesh holes and heavier gauge wire. The layers of mesh are pre-tensioned on a rigid support comprising a rectangular angle iron frame and adhered thereto. The screen is then inserted into C-channel rails arranged in a basket of a shale shaker. An example of this type of screen is disclosed in GB-A-1,578,948.

A further example of a known rigid support is disclosed in PCT Publication No. WO 01/76719, which discloses, among other things, a flat panel like portion having apertures therein and wing portions which are folded to form a support structure, which may be made from a single sheet of material. This rigid support has been assigned the Trade Mark UNIBODY by the applicants.

The layers of mesh in the screens wears out frequently and therefore needs to be easily replaceable. Shale shakers are generally in the order of 5 feet wide and 10 feet long. A screen of dimensions 4 feet wide by 10 feet long is difficult to handle, replace and transport. It is known to use two, three, four or more screens in a single shale shaker. A standard size of screen currently used is of the order of 4 feet by 3 feet.

U.S. Pat. No. 4,582,597 discloses a vibratory separator having a basket and channels arranged on internal faces of the basket for receiving the two sides of a screen assembly. An inflatable hose is arranged in the channels. The screen assembly comprises screening mesh laid over and fixed to a frame. The screen assembly is slid into the channels in the vibratory separator. The hose is inflated using a pneumatic fluid to force the frame of the screen assembly to assume a crowned center, in order to reduce whipping.

GB-A-2,176,424 discloses a vibratory separator having a basket and channels arranged on internal faces of the basket for receiving a screen assembly and a clamping device. The screen assembly comprises screening mesh laid over and fixed to a frame. The clamping device comprises a frame of similar dimensions to the frame of the screen assembly. The frame has an inflatable stocking thereon, which is attached to pneumatic or hydraulic fluid supply means. When both the screen assembly and the clamping device are slid into the channels, the stocking is inflated to fix the screen assembly in the channels. There is also disclosed a clamping device having an intermediate frame member on which a tributary of the stocking is arranged. Support members are provided above and below the screen assembly so that, in use the tributary is inflated to clamp the screen assembly between the supports.

GB-A-2,176,425 discloses a vibratory separator having a basket and channels arranged on internal faces of the basket for receiving a screen assembly. The screen assembly comprises screening mesh laid over and fixed to a frame. The channels have an inflatable stocking therein for clamping the frame of the screen assembly in the channels. The screen assembly also has a stiffening rib along each of two intermediate parts of the screen assembly and the vibratory separator has a tributary of the stocking along each of two intermediate parts of the vibratory separator, such that in use, the tributaries are inflated to clamp on the stiffening ribs.

U.S. Pat. No. 4,809,791 discloses a shaker having a screen. The screen is supported on flexible transverse arch-shaped beams attached to the sides of a frame. A ram is arranged in the shaker and is attached to the center of the flexible transverse arch-shaped beam. The ram is extended to increase the tension in the screen.

SUMMARY OF THE PRESENT INVENTION

The present invention discloses, in certain aspects, a vibratory separator or shale shaker with a basket with a first side spaced-apart from a second side; screen assembly apparatus [e.g., one, two, three, four or more screens or screen assemblies] mounted in the basket, the screen assembly apparatus having a central portion, a first screen side and a second screen side; central support apparatus connected to the basket and positioned beneath and in contact with the central portion of the screen assembly apparatus; pressing apparatus [e.g., mechanical apparatus for pressing down on a screen assembly or bladder apparatus] on the first side and second side of the basket for selectively pressing down on the first screen side and on the second screen side of the screen assembly apparatus so that the central portion of the screen assembly apparatus is higher than the first screen side and the second screen side. It has been noted that a support structure has to be very rigid and rigidly supported. In one aspect, the present invention attempts to provide an easily replaceable panel for a screen assembly of the pre-tensioned type or a partially pre-tensioned type, which is rigid and lightweight. A partially pre-tensioned type of screen assembly comprises one, two, three or more layers of screening mesh glued or otherwise attached to each other, and the layers are tensioned and are glued or otherwise attached to an apertured panel which is not rigid enough to provide a support when in use on its own in a shale shaker, but is strong enough to withstand the layers of screening material being tensioned thereover and attached to it. Bending of such a panel may occur under the tension of the layers of screening mesh, however, when the panel is placed over a support and locked in place, the layers of mesh are at a tension which is sufficient to be used in a shale shaker. It has been noted that by providing more support for the screen assembly, the frame can be lighter and retain sufficient rigidity. The frame can be made of less material, which can be transported more easily and after use, can be recycled more easily than a large heavy frame.

It is important to achieve maximum screening area in a given space and to obviate the need for mechanisms for fixing screen assemblies to shakers which blind areas of the screening material and which will decrease the screen assemblies screening capacity.

The present invention also attempts to provide a panel for a screen, which will increase the life of layers of screening material arranged thereon. In accordance with the present invention, there is provided a vibratory separator comprising a basket and a side rail for fixing at least a portion of a periphery of a screen assembly to said basket, characterized in that the vibratory separator further comprises means for pulling a screen assembly down within a periphery of a screen assembly to fix a screen assembly in said basket. Preferably, the means is pneumatically operable. However, the means may be hydraulically operable or be operable by both hydraulic and pneumatic means. Both means are suitable for inflating an inflatable bladder, which is preferred. The means may alternatively be mechanically operable, preferably by use of arms and gears, or hooks and tension bars or bolts, but may be any other suitable mechanism. Preferably, the means comprises a rail for engaging the screen assembly. Advantageously, the rail is T-shaped, although may be cup shaped or the rail may be of any suitable profile or hook. Advantageously, the means comprises an outer housing and an inner housing, the inner housing movable with respect to the outer housing for pulling a screen assembly downwardly to fix a screen assembly in the basket. Preferably, the rail is attached to the inner housing and the outer housing comprises a slit through which part of the rail passes. Advantageously, an inflatable bladder is arranged in the inner housing for moving the inner housing with respect to the outer housing. Advantageously, the outer housing has an intermediate member which passes through openings in the inner housing, the inflatable bladder arranged underneath the intermediate member. Preferably, the vibratory separator has a length and the inner housing and the outer housing extends substantially that length. Advantageously, the vibratory separator has a length and the rail extends substantially that length. Most oilrigs provide a predetermined size of footprint for a vibratory separator, which is usually rectangular. It is important to obtain as much screening area as possible in this footprint. Accordingly, it is preferable for the basket to be rectangular having a pair opposing side walls, the side rails arranged on each of the pair of opposing side walls and the means arranged therebetween. Advantageously, the basket comprises at least one beam linking the pair of opposing sides, the means arranged on the at least one beam. Preferably, the vibratory separator has a shoulder located within the periphery on to which the screen assembly is pulled on to, to fix a screen assembly in the basket. Advantageously, the means comprises a stationary part which forms the shoulder or land. Preferably, the means comprises a return mechanism to facilitate release of a screen assembly, so that the screen assembly can be removed from the vibratory separator. Advantageously, the return mechanism comprises at least one return spring. Preferably, an inflatable bladder is arranged in the side rail. The side rail may be arranged on inside walls of the basket. In a rectangular shaker, the side rails may be arranged on each side and perhaps one end wall and they may be arranged horizontally within the basket, or at an angle of up to 10 and preferably 7 to the horizontal. The present invention also provides a screen assembly for a vibratory separator, the screen assembly comprising a support and at least one layer of screening material, wherein the screen assembly has a periphery characterized in that the support further comprises a fitting within the periphery, the fitting for receiving a means for pulling the support downwardly and fixing the screen assembly in the vibratory separator. Advantageously, the fitting comprises a rail. Preferably, the screen assembly has a length and the rail extends the length of the screen assembly. Advantageously, the rail takes the form of a T-bar.

Preferably, the rail is a channel. The channel may have internal projections for receiving a hook or T-bar rail. Advantageously, the fitting is centrally mounted. In one aspect, a pull down member is engageable with the fitting, the pull down member having arms, which in use, are engageable in clamping rails of a vibratory separator, such that upon activation of the clamping rails, the arms push the pull down member downwardly, pulling the support downwardly and fixing the screen assembly in the vibratory separator.

Preferably, the screen assembly further comprises a rigid chassis having a plurality of ribs, each of which forms a shoulder, in use the support is pulled down and fixed on the shoulders. Advantageously, the support comprises a panel having apertures therein. Preferably, the screen assembly further comprises a rigid chassis, the fitting formed in the rigid chassis, spaced from the panel, such that in use filtered material flows therearound. Preferably, the panel comprises folded portions. Preferably, the at least one layer of screening material is adhered to the side portions of the panel. Advantageously, the at least one layer of screening material is adhered to the area provided about each aperture. Preferably, the at least one layer of screening material comprises at least a first layer of screening mesh arranged on top of a second each other, wherein the mesh size of the second layer is the same or larger that of the first layer and has larger diameter wires making up the mesh. Advantageously, the screen assembly comprises a third layer of screening mesh. Each layer may be glued to the next with a hot melt glue or resin in a pattern which substantially corresponds with the periphery of each aperture, such that screening area is not impeded. Preferably, the panel is flexible, although may be rigid. The panel may be flexible, such that the panel can withstand any tension in the layers of screening material laid and attached thereto, (although the panel may bend a little under this tension) but is not rigid enough to support the screening material without the need for additional screen support when in use in a vibratory separator. The present invention also relates to a vibratory separator comprising a screen assembly of the invention, the vibratory separator further comprising a basket, a vibratory mechanism and a clamping mechanism for fixing the screen assembly to the basket. Preferably, the clamping mechanism comprises a pneumatic means, and most preferably an inflatable bladder and is preferably arranged in C-shape channels arranged about the inside wall of the basket.

The present invention also relates to a method for fitting a screen assembly in a vibratory separator, the screen assembly comprising a support having at least one layer of mesh arranged thereon, the method comprising the steps of inserting the screen assembly into a clamping mechanism of a vibratory separator, operating the clamping mechanism wherein at least part of the screen assembly within its perimeter is pulled down to fix the screen assembly in the vibratory separator. Preferably, the screen assembly further comprises a pull down member, the method further comprising the step of operating the clamping mechanism depresses a pull down member, pulling intermediate parts of the panel on to the support structure.

It is, therefore, an object of at least certain preferred embodiments of the present invention to provide new, useful, unique, efficient, non-obvious: vibratory separators; shale shakers; screen assemblies for them; and methods of their use.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of certain embodiments of the invention may be had by references to the embodiments which are shown in the drawings which form a part of this specification.

FIG. 2 is an rear end view of a first embodiment of a screen assembly according to the present invention shown partly in cross-section, the screen assembly arranged in clamping rails of a shale shaker, the screen assembly comprising a panel, a support structure and a pull down member.

FIG. 2A is a cross-section view of the panel shown in FIG. 2.

FIG. 2B is an end view of the pull down member shown in FIG. 2. FIG. 2C is an end view of the support structure shown in FIG. 2. FIG. 2G is an enlarged top view of part of the panel shown in FIGS. 2 and 2D.

FIG. 3B is a rear end view of part of the central clamp shown in FIG. 3. FIG. 3C is a side view of the part of the central clamp shown in FIG. 3. FIG. 3D is a view in cross-section of the part of the central clamp taken along line 3D—3D of FIG. 3c. FIG. 3E is a top view of the part of the central clamp of FIG. 3B. FIG. 3L is a rear end view of the screen assembly shown in FIG. 3, arranged in the side clamping rails and the central clamp of the shale shaker of FIG. 3, the central clamp deactivated. FIG. 3M is a rear end view of the screen assembly shown in FIG. 3, arranged in the side clamping rails and the central clamp of the shale shaker of FIG. 3, the central clamp activated.

FIG. 7B is a top view, FIG. 7C is a rear view, FIG. 7D is a front view, FIG. 7E is a bottom perspective view of the screen assembly of FIG. 7A.

FIG. 12A is a top view and FIG. 12B is a front view of a screen assembly according to the present invention. FIG. 12C is a front view of a screen assembly according to the present invention.

FIG. 13A is a top view and FIG. 13B is a front view of a screen assembly according to the present invention.

FIG. 14A is a side cross-section view showing abutting screen assemblies as installed with a method according to the present invention.

DESCRIPTION OF EMBODIMENTS PREFERRED AT THE TIME OF FILING FOR THIS PATENT

Figure 1:
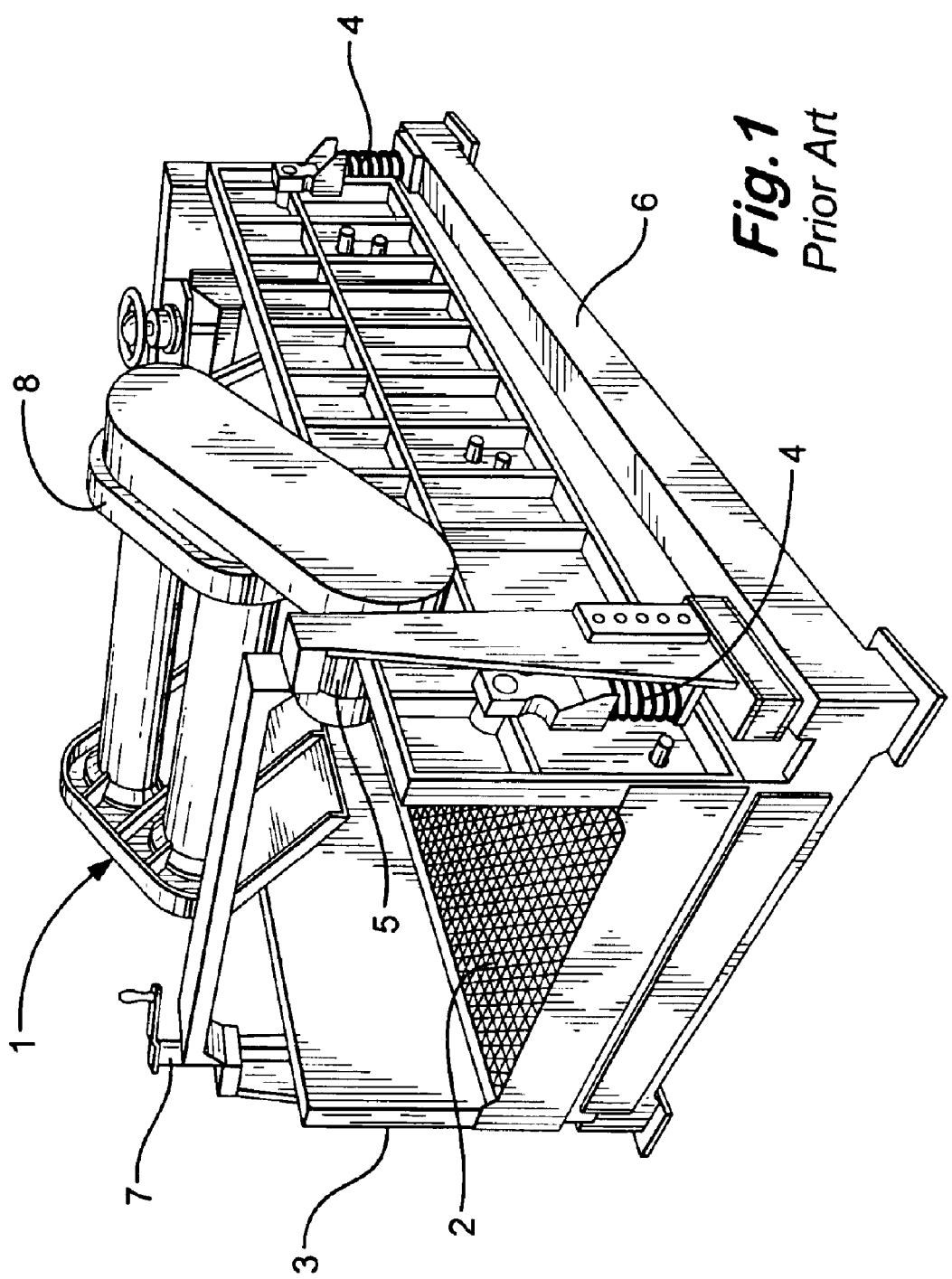
FIG. 1 is a perspective view of a shale shaker of a known type.

Referring to FIG. 1, a prior art shale shaker 1 is shown with a screen assembly 2 mounted therein. The screen assembly comprises a frame (not shown) and a layer of screening material tensioned over the frame. The screen assembly 2 is mounted in a basket 3, which has: an open bottom, for allowing fluid and small particles to pass into a receptacle (not shown) therebeneath; a feed end at which material to be screen is introduced (to the right of the drawing) and a mouth (to the left of the drawing) for allowing large particles to pass into a skip or ditch. The basket 3 is mounted on springs 4 (only two shown; two as shown are on the opposite side) which are supported on a structure 6. The basket 3 and the screen assembly 2 mounted therein is vibrated by a motor 5 interconnected with vibrating apparatus 8. The vibrating apparatus 8 may be of the type which comprises an unbalanced weight on the end of the motors drive shaft. Elevator apparatus 7 provides for raising and lowering of the basket end. Typically the basket will be in a "climb the hill" position so that a pool of liquid is maintained at one end within the basket.

Referring to FIG. 2, there is shown a screen assembly, generally identified by reference numeral 100. The screen assembly 100 comprises a panel 101, a support structure 102 and a pull down member 103. In use, the panel 101 would have at least one layer of screening material adhered or otherwise attached thereto. Typically, each layer of screening material comprises a layer of wire mesh. Typically, the panel 101 would have three layers of wire mesh lying one over the other, the lowermost layer of wire mesh having larger openings and larger wires. In use, the screen assembly 100 is arranged in clamping rails 104 and 105 of a shale shaker.

Figure 2D:
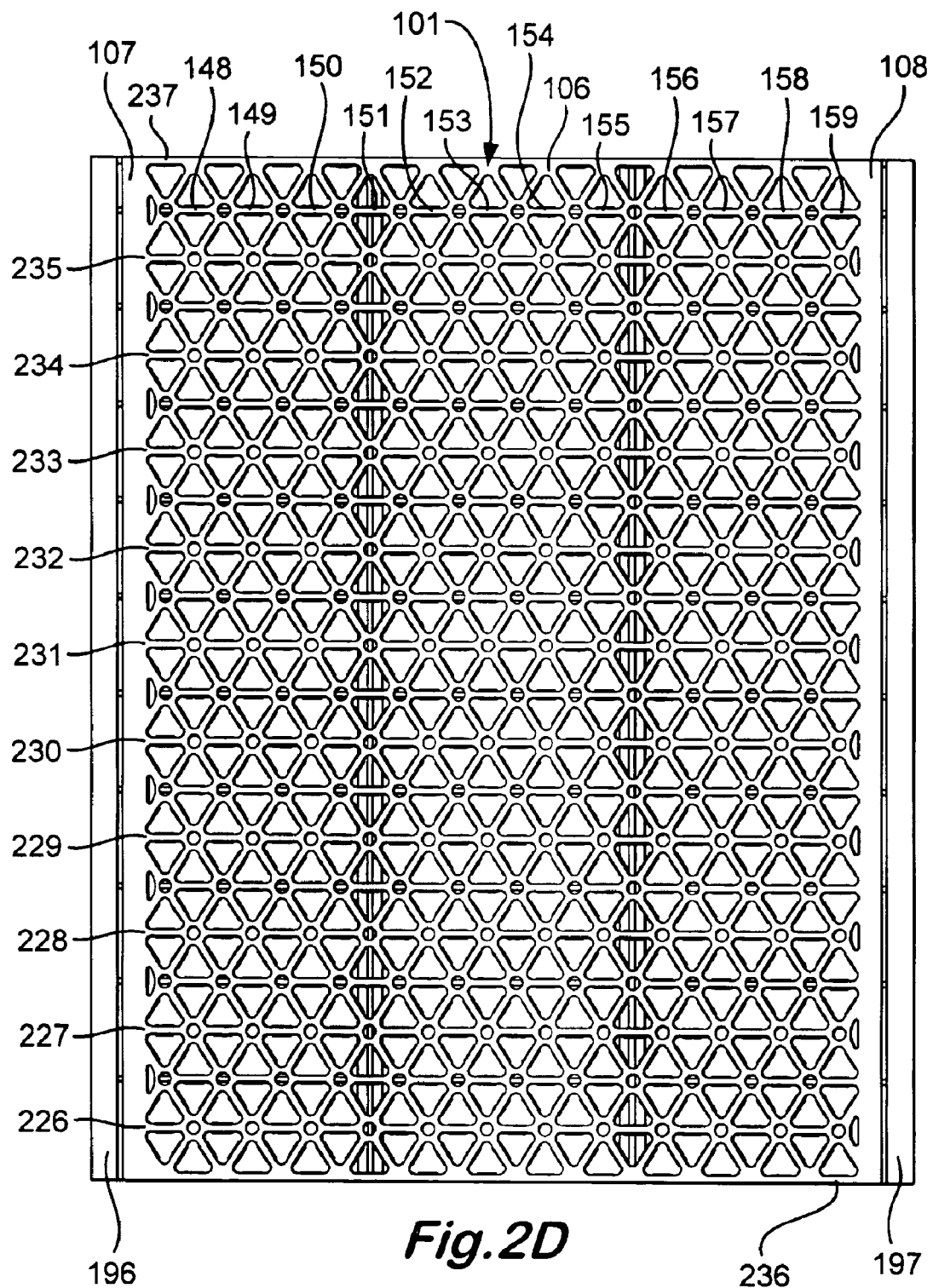
FIG. 2D is a top plan view of the panel shown in FIG. 2A fitted to the pull down member shown in FIG. 2B.
Figure 2E:
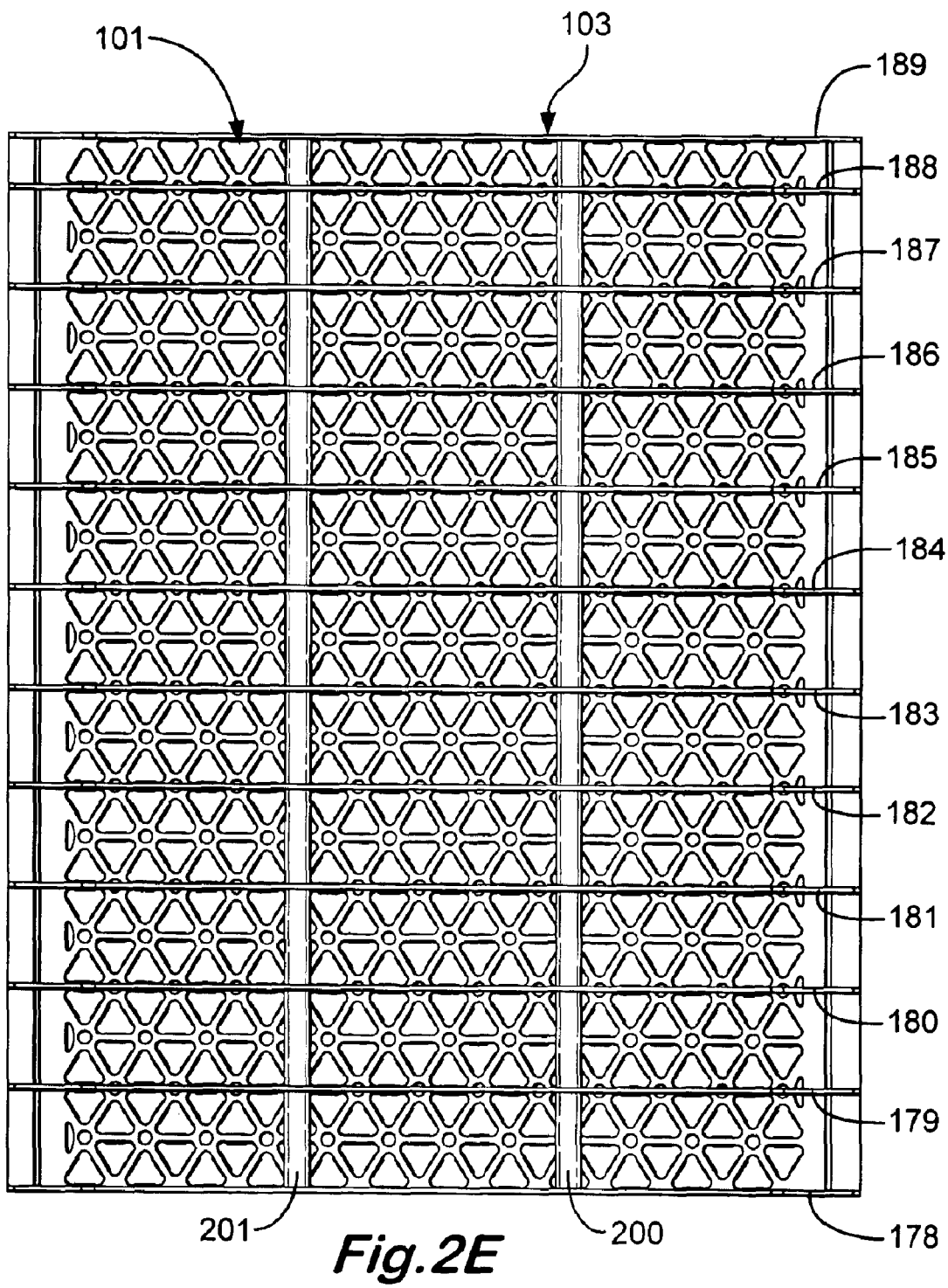
FIG. 2E is an underneath view of the panel shown in FIG. 2A fitted to the pull down member shown in FIG. 2B.

Referring to FIGS. 2A, 2D and 2G, the panel 101 is made from a 1.5 mm mild steel plate. The panel 101 comprises an area 106 provided with a plurality of apertures, a left side portion 107 provided with no apertures and a right side portion 108 provided with no apertures. The plurality of apertures in area 106 comprises a plurality of triangular apertures and a plurality of circular openings.

The panel 101 is formed from a blank shown in FIG. 1H. Lines 110 and 111 and fold lines 112 and 113 indicate the boundary of area 106 which will be provided with the plurality of apertures. The area 106, the left side portion 107 and right side portion 108, all lie in the same plane to form a flat top surface. Left side portion 107 and right side portion 108 extend the entire length of the panel 101. Wing portions 114 and 115 approximately 1 cm wide extend the entire length of the panel 101. The wing portions 114 and 115 are folded downwardly to stand approximately at right angles to the top surface. The forward end of the panel 101 has a forward end portion 116 extending the width of the panel 101 and is folded downwardly along fold line 112 to be perpendicular to the top surface of the panel 101. The trailing end of the panel 101 has a rear end portion 117 folded downwardly along fold line 113, such that the rear end portion 117 lies perpendicularly to the top surface of the panel 101. A screen interface, such as those disclosed in PCT Publication Number WO 01/97947 may be used at both the front and rear of the panel. The folded wing portions 114 and 115 and the folded end portions 116 and 117 meet at their respective side edges, at which they may be welded together, soldered or otherwise joined.

Figure 2F:
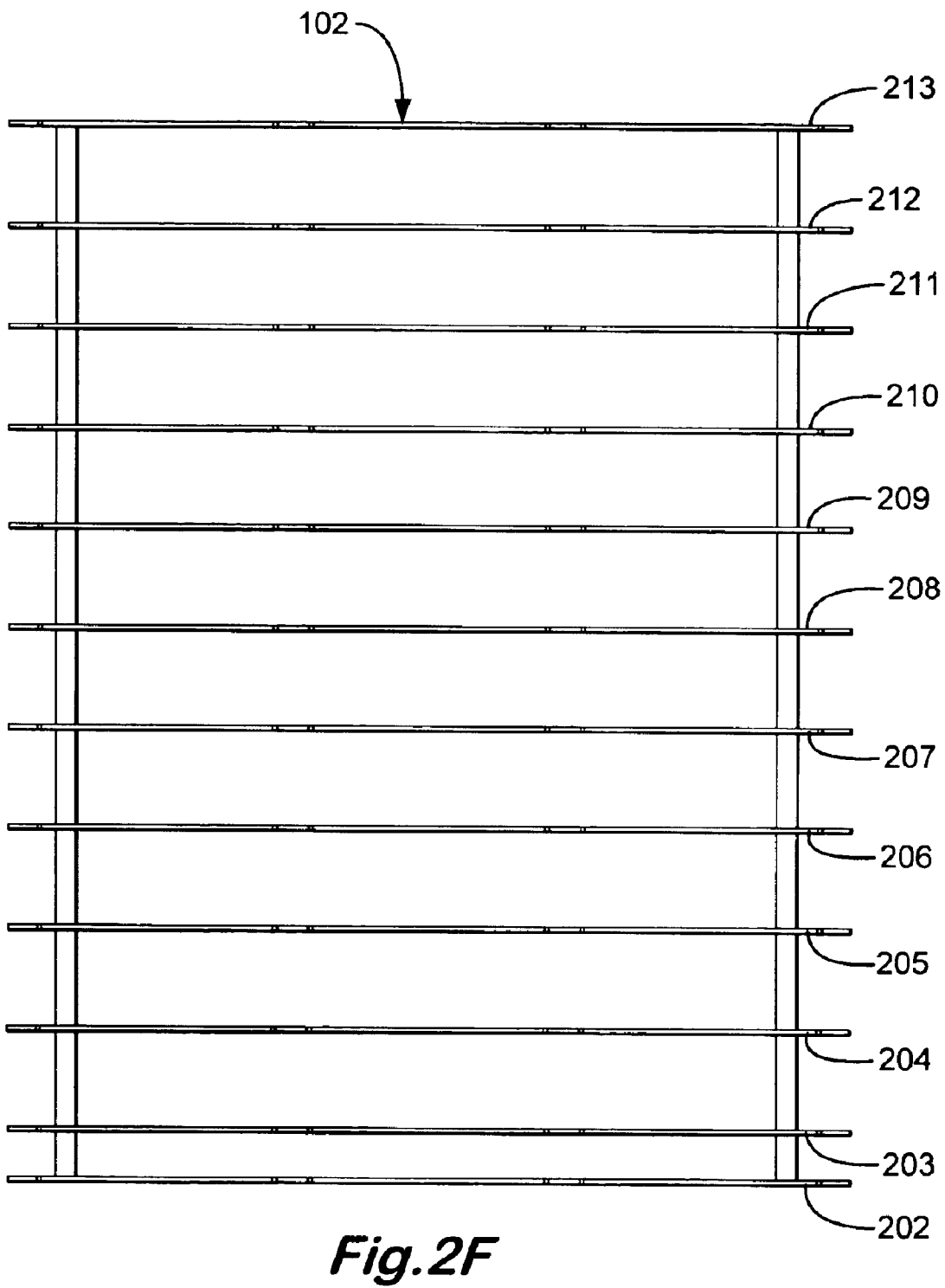
FIG. 2F is a top plan view of the support structure as shown in FIG. 2C.
Figure 2H:
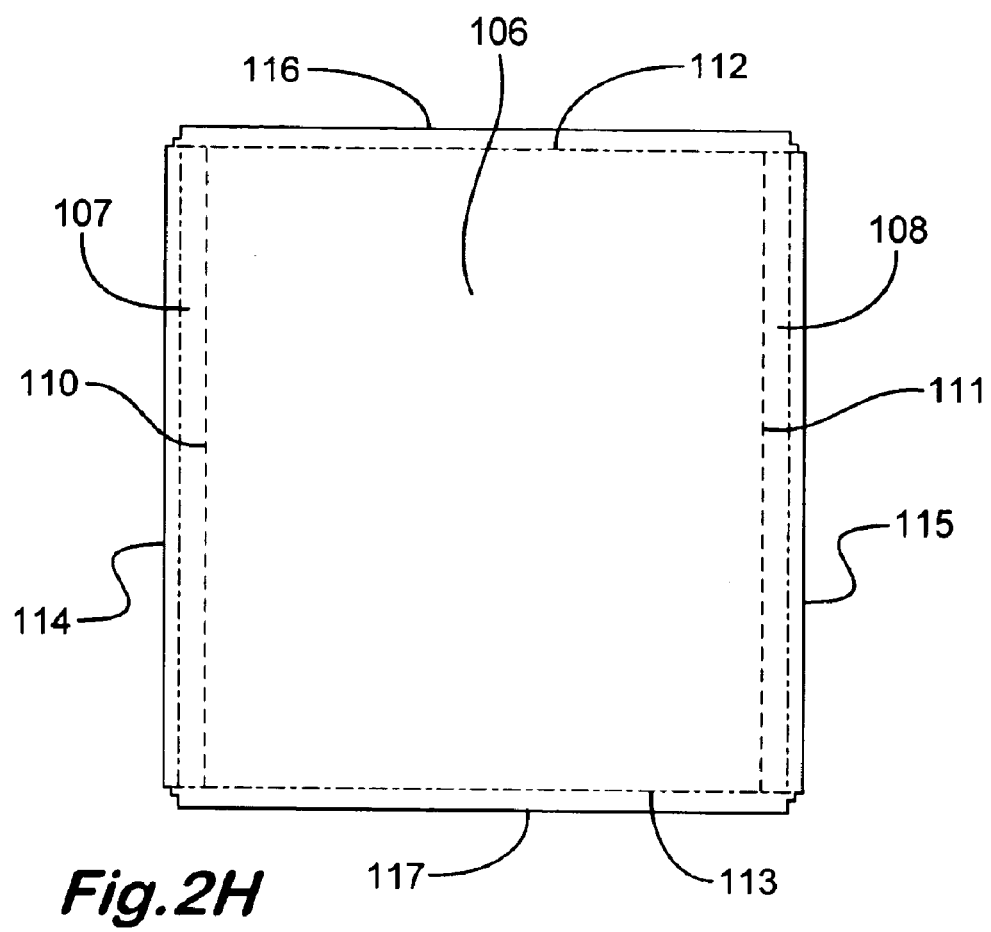
FIG. 2H is a top plan view of a blank used in the construction of a panel in accordance with the present invention.
Figure 2I:
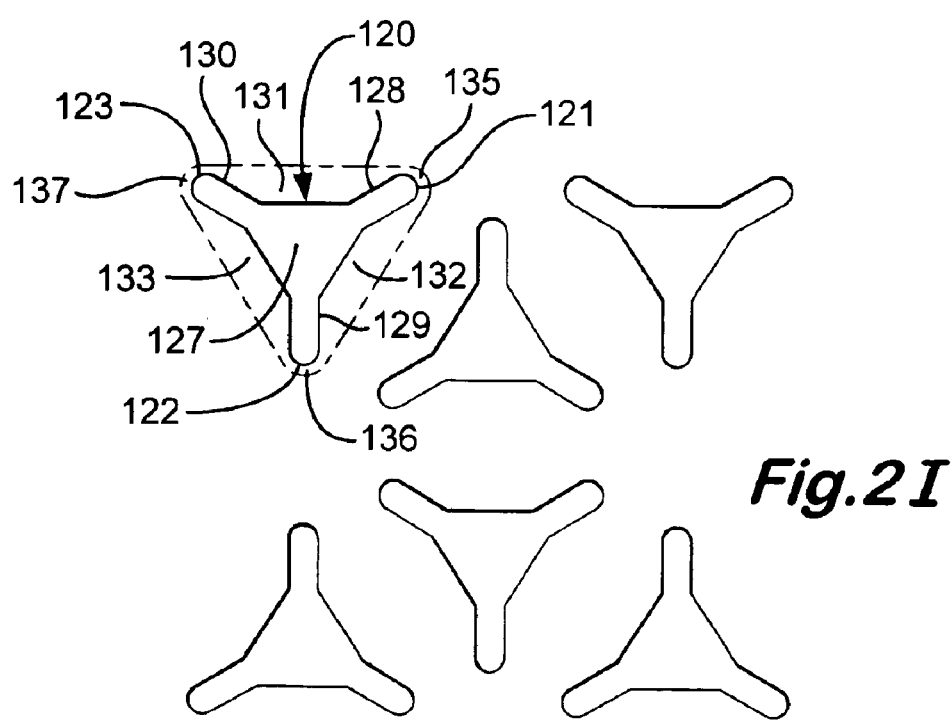
FIG. 2I is a template used in the construction of the panel of the present invention.

The area 106 of the blank shown in FIG. 2H has a plurality of apertures including a plurality of triangular apertures and a plurality of circular apertures formed therein. One of the triangular apertures is identified by reference numeral 118 and one of the circular openings is identified by reference numeral 119. The triangular aperture 118 is formed by first punching, laser cutting, sawing, drilling, milling or casting the blank with an opening 120, in the shape shown in the template shown in FIG. 1I. The shape comprises three semi circular ends 121, 122 and 123 each arranged within and close to where a respective vertex 124, 125 and 126 of the triangular aperture 118 is to be formed, as shown in FIG. 1G; and a small triangular opening 127 concentric with the triangular aperture 118 to be formed and slots 128, 129 and 130 link the semi circular ends 121, 122 and 123 to form structural portions 131, 132 and 133. The structural portions 131, 132 and 133 are folded downwardly along fold line 134, over a form tool (not shown) having a similar profile to the fold line 134. The structural portions 131, 132 and 133 are folded by the form tool to an angle of approximately 65 to the surface of the panel 101 to form edges 131a, 132a, and 133a. The areas 135, 136 and 137 of panel 101 bounding the semi circular ends 121, 122 and 123 are also folded downwardly.

Referring back to FIGS. 1D and 1G, triangular apertures, such as triangular aperture 118, are arranged in ten full sets of rows in the panel 101 and one further row of a set. A first set 138 comprises a first row 139 having a rearwardly pointing triangular aperture 118 and a forwardly pointing triangular aperture 140 adjacent thereto, such that folded structural portion 132 and a folded structural portion 141 of the forwardly pointing triangular aperture 140 form a panel rib 142, approximately 2.3 mm wide. An apex 143 of the forwardly pointing triangular aperture 140 is rearwardly offset by approximately 2.3 mm from a base edge 131a of the rearwardly pointing triangular aperture 118. The first row 139 comprises twelve forwardly pointing triangular apertures interspaced by twelve rearwardly pointing triangular apertures. The first set 138 also comprises a second row 144, which is a mirror image of the first row 139 about line A—A. A structural portion 145 of forwardly pointing triangular aperture 140 of the first row 139 and a structural portion 146 of a rearwardly pointing triangular aperture 147 of the second row 144, form a panel rib 148. The underside of panel rib 148, the structural portion 145 and the structural portion 146 form a channel. The panel rib 148 is in line with panel ribs 149 to 159 in the first set 138, the undersides of which form a channel which extends the width of the panel 101. Circular opening 119 is drilled, punched, laser cut or otherwise formed in the panel 101 between vertices 125, 160, 161 and 162 of rearward pointing triangular aperture 118, forward pointing triangular aperture 163, forward pointing triangular aperture 140 and rearward pointing triangular aperture 147 respectively. A segment opening 164 arranged between rearward pointing triangular aperture 118, forward pointing triangular aperture 163 and circular hole 119 is punched, laser cut or otherwise formed in the panel 101, having a straight portion following line 110 of the blank, shown in FIG. 1H and a curved portion extending toward the rearward pointing triangular aperture 118, forward pointing triangular aperture 163 and circular opening 119.

Similarly, circular opening 165 is drilled, punched, laser cut or otherwise formed in the panel 101 between vertices 166, 167, 168, 169, 170 and 171 of forward pointing triangular aperture 140, rearward pointing triangular aperture 172, forward pointing triangular aperture 173, rearward pointing triangular aperture 174, forward pointing triangular aperture 175, and rearward pointing triangular aperture 147 respectively.

Referring to FIG. 2A, the panel 101 further comprises two inverted T-shape rails 176 and 177, arranged longitudinally from the forward end portion 116 to the rear end portion 117. The inverted T-shape rails 176 and 177 are spaced at intermediate the left side and right side of the panel 101, preferably, each located at a third of the width between the left and right sides. The inverted T-shape rails 176 and 177 are welded to the panel 101 at the root of the T.

Referring to FIGS. 2, 2B, 2D and 2E, the pull down member 103 comprises twelve substantially identical ribs 178 to 189. Rib 178 is made from 3 mm steel plate. The rib 178 has a body portion 190, a left arm 192 extending along a top of the body portion provided with a head 193; and a right arm 194 extending along a top of the body portion provided with a head 195. A left side runner 196 is welded to the head 193 and a right side runner 197 is welded to the head 195. The left side runner 196 and right side runner 197 extend the entire length of the screen assembly 100. Two receiving rails 198 and 199 are welded in respective recesses 200 and 201 in the body portion 190, intermediate the rib 178, preferably, each located at a third of the length of the rib from either end thereof. The receiving rails 198 and 199 are of a C-shape cross-section to receive the inverted T-rails 176 and 177. The eleven other ribs 179 to 189 have corresponding heads, which are welded at intervals therealong to the left side runner 196 and right side runner 197 respectively and corresponding recesses in which receiving rails 198 and 199 are welded. The rib 178 is at a rear end; rib 179 is arranged slightly less than two intervals from rib 178; rib 180 is arranged two intervals from rib 179; rib 181 is arranged two intervals from rib 180; rib 182 is arranged two intervals from rib 181; rib 183 is arranged two intervals from rib 182; rib 184 is arranged two intervals from rib 183; rib 185 is arranged two intervals from rib 184; rib 186 is arranged two intervals from rib 185; rib 187 is arranged two intervals from rib 186; rib 188 is arranged two intervals from rib 187; rib 189 is arranged slightly less than one interval from rib 187. An interval being equal to the width of a row 139, 144 in the panel 101; and two intervals being equal to the width of a set of rows 138 in the panel 101.

Referring to FIGS. 2, 2C and 2F the support structure 102 comprises twelve substantially identical support ribs 202 to 213. Support rib 202 is made from 3 mm steel plate. The support rib 202 has a body portion 214, a left arm 215 extending from the body portion having a bottom face 216, and a right arm 217 having a bottom face 218. A left side support bar 219 is welded in recess 220 in the left side of the body portion 214 and a right side support bar 221 is welded in recess 222 in a right side of the body portion 214. The left side support bar 219 and right side support bar 221 extend the entire length of the screen assembly 100. Two recesses 223 and 224 in the body portion 214 are located intermediate the ends of the rib 202, preferably, each located at a third of the length of the rib 214 from either end thereof. The top edge 225 of the support rib 202 is provided with a chamfer. The eleven other ribs 203 to 213 are welded into corresponding recesses 220 and 221, at intervals along the left side support bar 219 and right side support bar 221 respectively. The support rib 202 is at a rear end of the screen assembly 100. Support rib 203 is arranged one interval from support rib 202; support rib 204 is arranged two intervals from support rib 203; support rib 205 is arranged two intervals from support rib 204; support rib 206 is arranged two intervals from support rib 205; support rib 207 is arranged two intervals from support rib 206; support rib 208 is arranged two intervals from support rib 207; support rib 209 is arranged two intervals from support rib 208; support rib 210 is arranged two intervals from support rib 209; support rib 211 is arranged two intervals from support rib 210; support rib 212 is arranged two intervals from support rib 211; support rib 213 is arranged two intervals from support rib 212. An interval being equal to the width of a row 139, 144 in the panel 101; and two intervals being equal to the width of a set of rows 138 in the panel 101.

The screen assembly 100 is assembled by sliding the inverted T-shape rails 176 and 177 of the panel 101 into the receiving rails 198 and 199 of the pull down member 103. The pull down member 103 is located in the support structure 102. The ribs 178 to 189 are inserted into support ribs 202 to 213. End ribs 178 and 189 are inserted inside support ribs 202 and 213. Rib 179 is arranged one interval from support rib 203 and one interval from support rib 204; rib 180 is arranged one interval from support rib 204 and one interval from support rib 205; rib 181 is arranged one interval from support rib 205 and one interval from support rib 206; rib 182 is arranged one interval from support rib 206 and one interval from support rib 207; rib 183 is arranged one interval from support rib 207 and one interval from support rib 208; rib 184 is arranged one interval from support rib 208 and one interval from support rib 209; rib 185 is arranged one interval from support rib 209 and one interval from support rib 210; rib 186 is arranged one interval from support rib 210 and one interval from support rib 211; rib 187 is arranged one interval from support rib 211 and one interval from support rib 212; rib 188 is arranged one interval from support rib 212 and one interval from support rib 213 and slightly less than one interval from rib 189. The support ribs 203 to 212 align underneath the lines of panel ribs 226 to 235 between structural portions folded to form the edge of the apertures. Support rib 202 aligns with line of panel ribs 236 and support rib 213 aligns with line of panel ribs 237.

The panel 101 has at least one layer screening mesh arranged thereon. The layer of screening mesh may be tensioned and adhered to the outer perimeter of the panel 101 and to all of the panel ribs. Preferably, at least three layers are applied. The layers may be of the same mesh grade or of different mesh grades. Preferably, a layer of screening mesh having larger openings and larger wires lies beneath layers of fine mesh.

In use, the screen assembly 100 has layers of mesh (not shown) arranged on the panel, and is slid into clamping rails 104 and 105 of a shale shaker. The clamping rails 104 and 105 comprise a C-shape rail 240 and 241 having a bottom surface 242 and 243 on which the support structure 102 of the screen assembly 100 rests. The C-shape rail 240 and 241 also has a pneumatically inflatable bladder 244 and 245 fixed to an upper part 246 and 247 of the C-shape rail. The inflatable bladder 244, 245 is inflated which pushes down on side portions 107 and 108 of the panel 101, pushing the panel 101 on to the top edges 225 of the twelve supporting ribs 202 to 213. The pneumatic bladder also engages side runners 196 and 197 of the pull down member 103, which pushes the pull down member 103 downwardly, pulling the inverted T-shape rails downwardly within recesses 223 and 224. The panel 101 is pulled down along the inverted T-shape rail to pull the panel 101 down on to the supporting ribs 202 to 213. The supporting ribs 202 to 213 lie underneath the circular openings 119, 165, which partially blinds the openings, however, this is not significant as the ribs are below the level of the top surface of the layers of screening mesh.

The downwardly folded wings 114 and 115 of the panel 101 locate over the ends of the supporting ribs 202 to 213 and forward end portion 116 and rear end portion 117 are located over supporting rib 213 and 202.

Drilling mud having solids entrained therein is introduced at a feed end of the shale shaker and is shaken along the layers of mesh on the screen assembly. Fluid and small particles pass through the layers of mesh on the screen and through the triangular apertures and the circular openings in the panel 101 and past the pull down member 103 and the support structure 102 and into a receiver (not shown). The larger solids pass over the layers of screening material and out of a discharge end of the shale shaker into a skip or ditch.

The most likely component to wear out or fail first, is the layers of screening material arranged on the panel 101. The screen assembly 100 is removed from the C-shape rails 104 and 105. The panel 101 having layers of worn out screening mesh thereon and the pull down member 103 may be lifted from frictional engagement with the support structure 102. The panel 101 is slid out from receiving rails 198 and 199 and replaced with a new panel having layers screen mesh thereon. The rails of the new panel are slid into the receiving rails of the pull down member 103. The pull down member 103 with the new panel is placed on the original support structure 102 and slid back into the shale shaker.

It is envisaged that the panel may be of any known type, such as 1.5 mm to 3 mm steel, aluminum or plastics material plate with a multiplicity of apertures punched therein or perforated plate, not having folded edges to the apertures. The apertures may be oblong, pentagonal, hexagonal, heptagonal, octagonal, circular or any other shape.

The layers of screening material used in any of the embodiments shown herein and in any embodiment of the invention, may be pre-tensioned and adhered, bonded or otherwise attached to the panel. The layer of mesh may be bonded using a heat activated powder.

Figure 3:
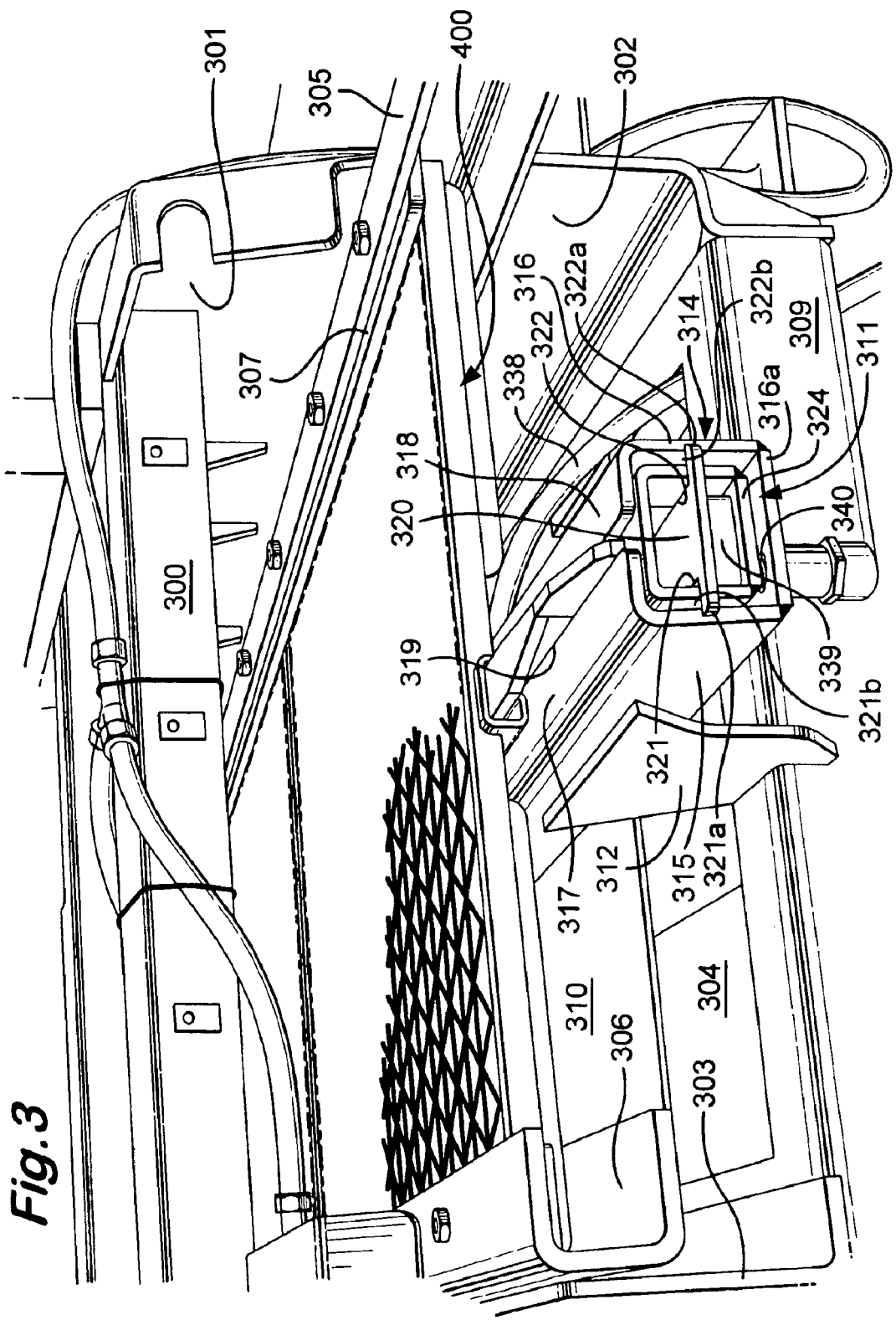
FIG. 3 is a perspective view of a second embodiment of a screen assembly according with the present invention, the screen assembly arranged in a shale shaker according to the present invention, the shale shaker having side clamping rails and a central clamp.
Figure 3A:
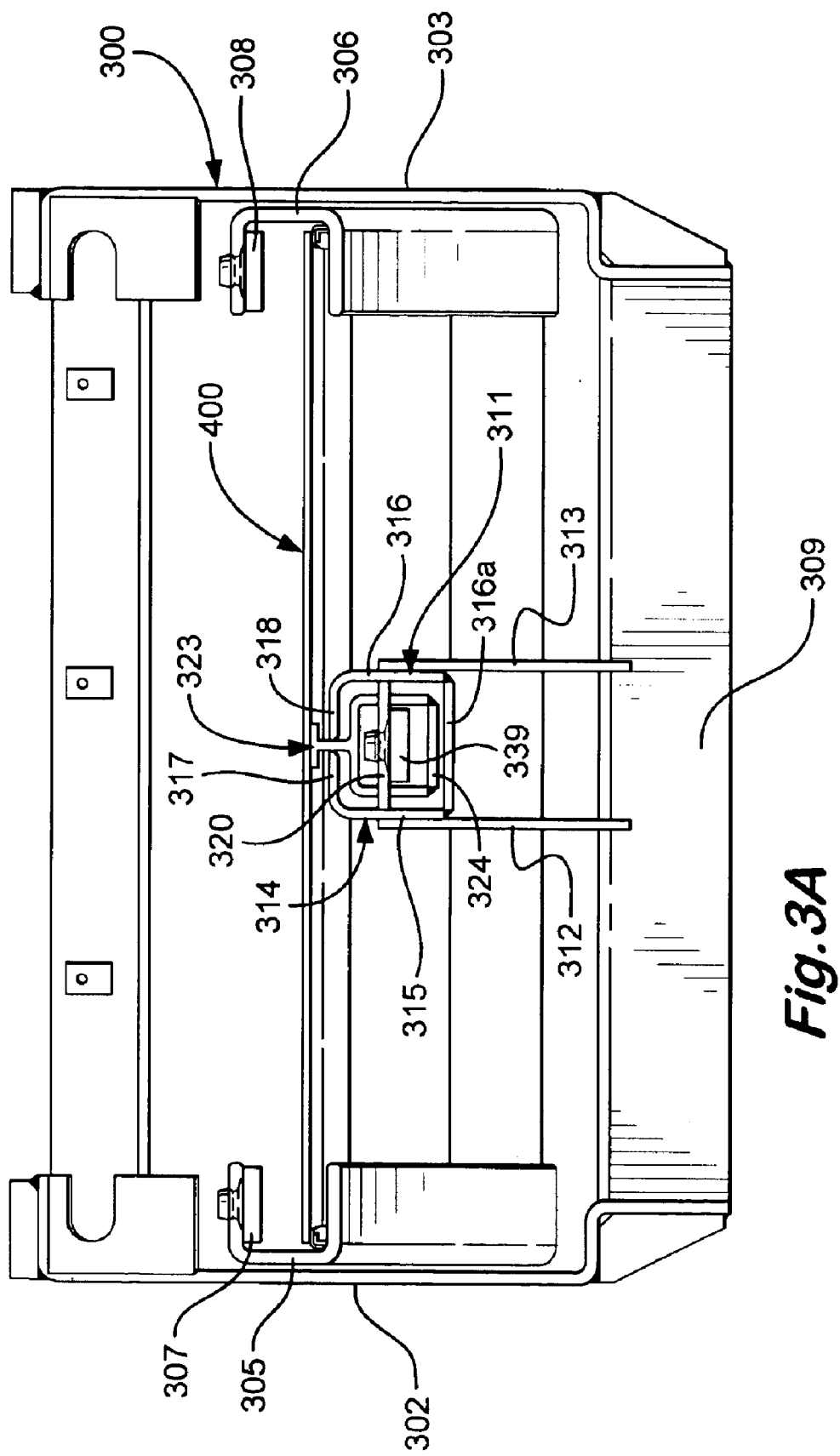
FIG. 3A is a rear end view of the shale shaker and screen assembly shown in FIG. 3.
Figure 3F:
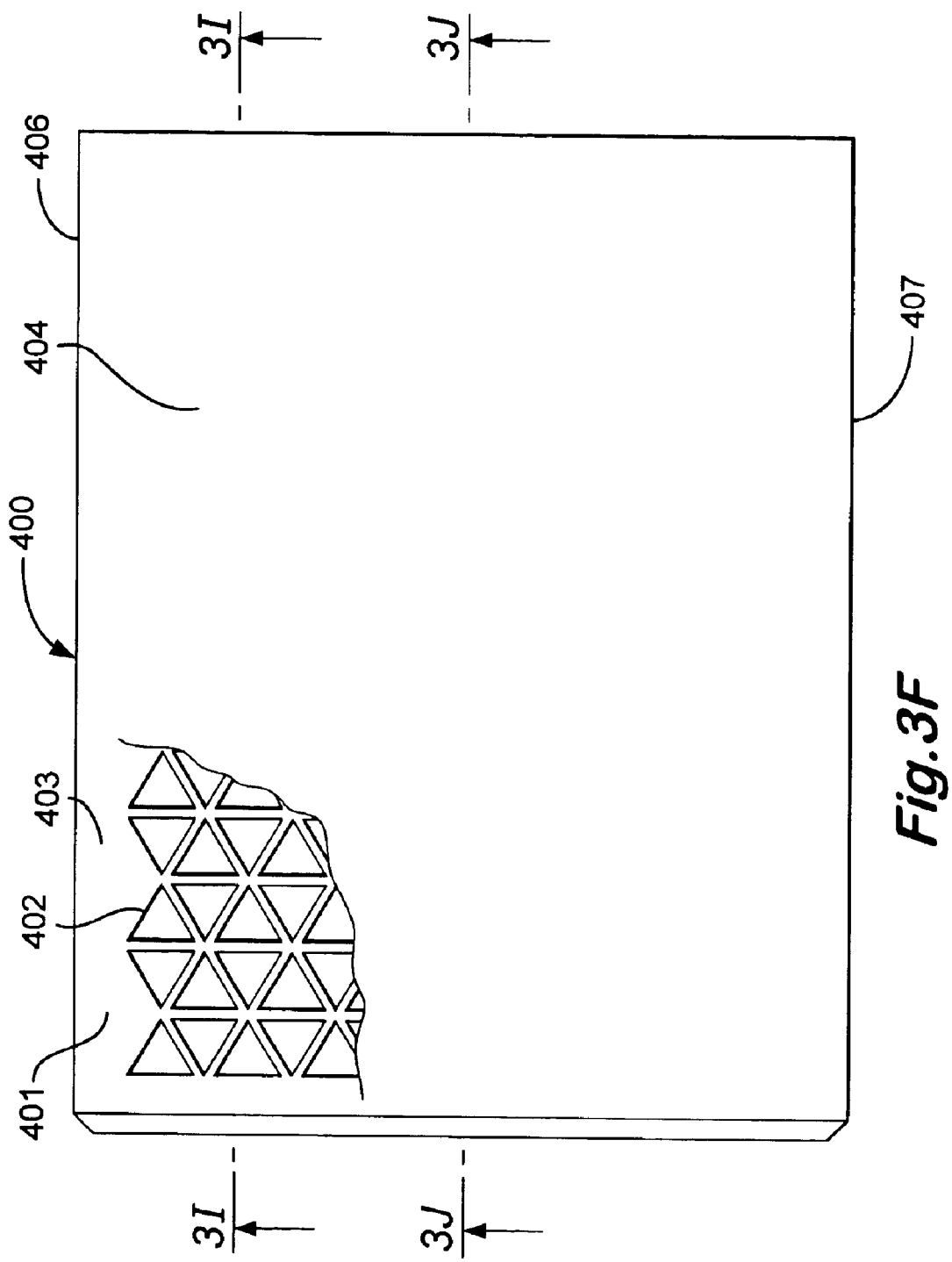
FIG. 3F is a top plan view of the screen assembly shown in FIG. 3, with a portion of screening material cutaway.
Figure 3G:
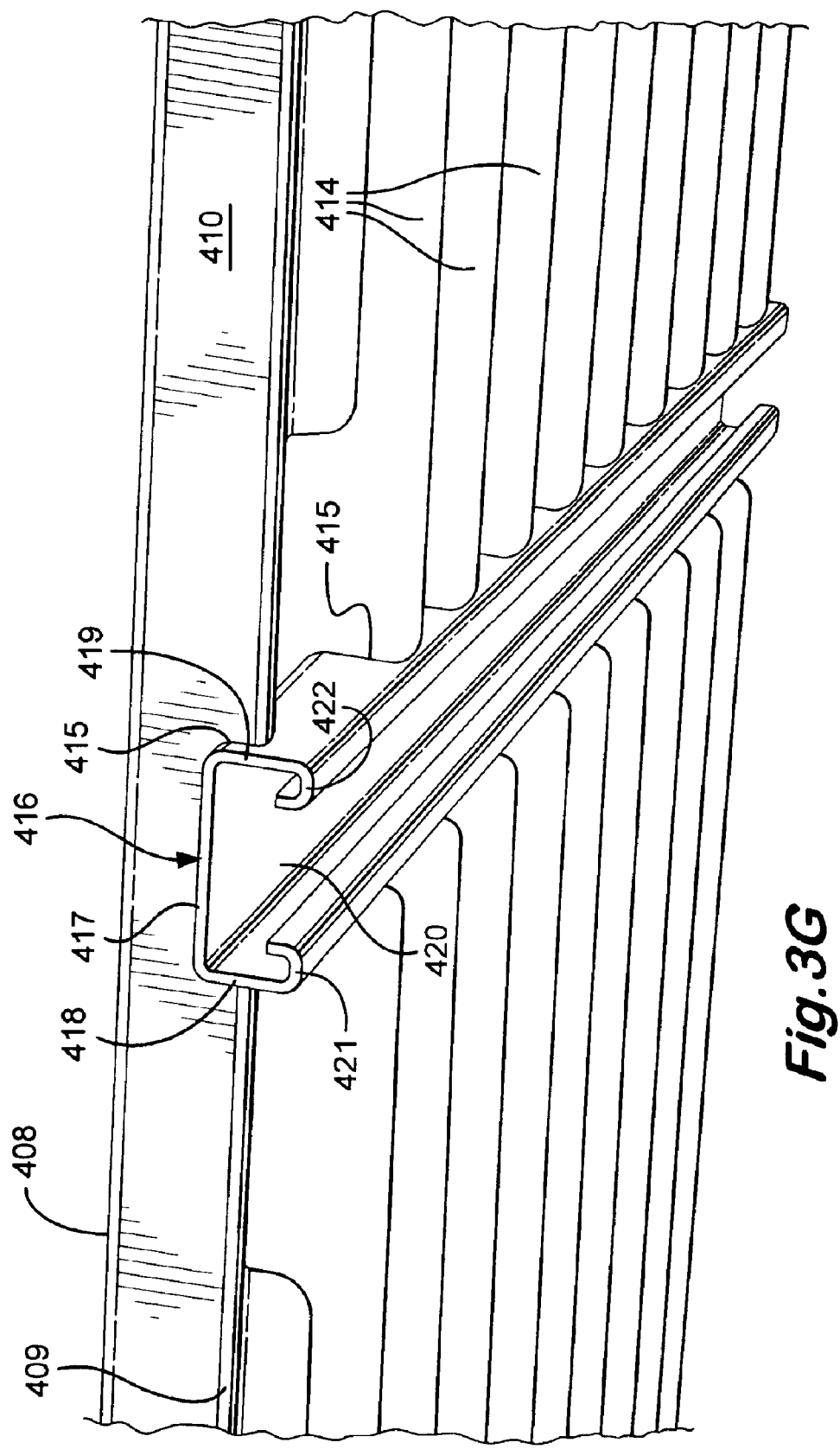
FIG. 3G is a perspective view of the rear end and underneath of the screen assembly shown in FIG. 3.
Figure 3H:
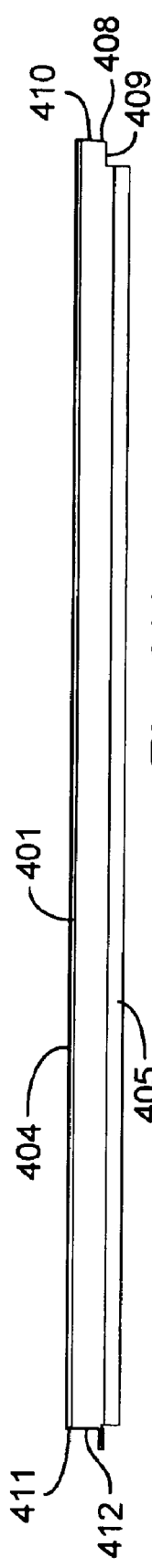
FIG. 3H is a side view of the screen assembly shown in FIG. 3.
Figure 3I:
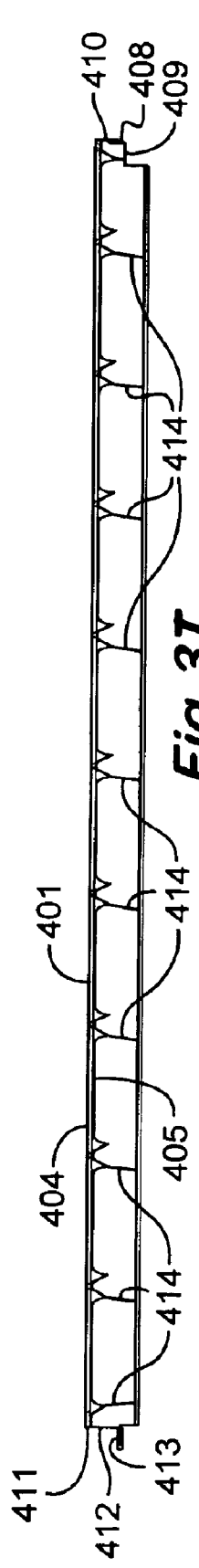
FIG. 3I is a view in cross-section taken along line 3I—3I of FIG. 3F.
Figure 3J:
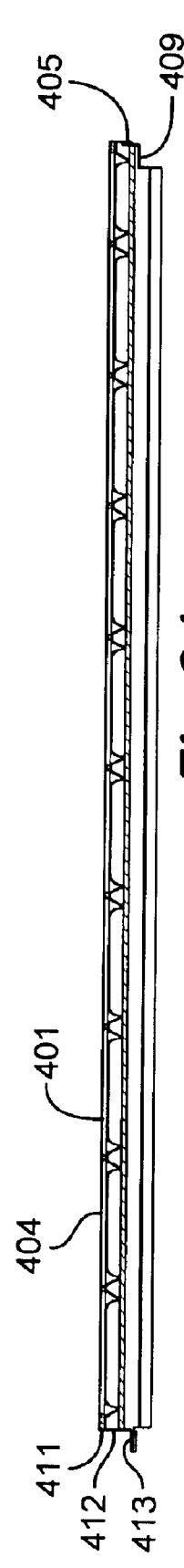
FIG. 3J is a view in cross-section taken along line 3J—3J of FIG. 3F.
Figure 3K:
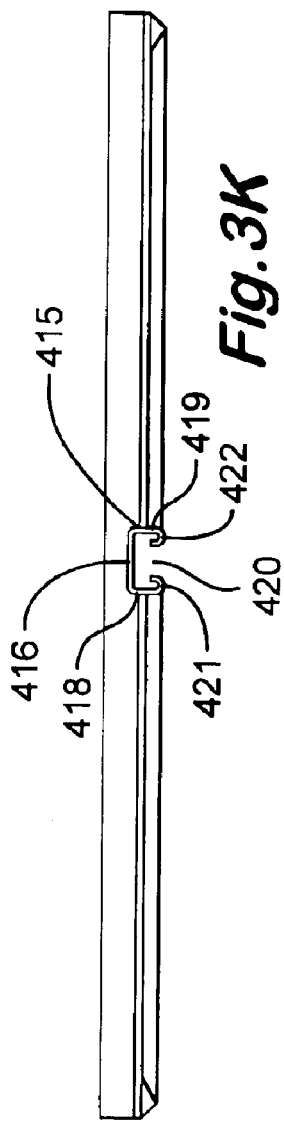
FIG. 3K is a rear end view of the screen assembly shown in FIG. 3.

Referring to FIGS. 3 and 3A, there is shown a screen assembly 400 arranged in a shale shaker 300. The shale shaker 300 comprises a basket 301 having solid walled sides 302 and 303 and an open bottom 304. C-shape rails 305 and 306 are located on the inside of solid walled sides 302 and 303 respectively. The C-shape rails 302 and 303 may be welded or otherwise attached or formed integrally with the solid walled sides 302 and 303. The C-shape rails may be arranged parallel with the top and bottom of the basket, or may be arranged at an angle thereto, such that the screen assemblies arranged in the C-shape rails 305 and 306 lie at an incline from the feed end to the mouth of the basket. This incline may be between 2 to 10 and may be 7 and the incline may not be continuous along the length of the basket of the shale shaker. The rake of the basket may also be adjustable by use of an elevator apparatus, similar to the elevator apparatus shown in FIG. 1.

An end wall (not shown) at a feed end of the basket 301 may also be provided with a C-shape rail (not shown), or other form of sealing member on to which an end of a screen assembly 400 may seal against. The C-shape rails 305 and 306 are each provided with an inflatable bladder 307 and 308 such as an inflatable hose or stocking. The bladder 307 and 308 may be made from a rubber or synthetic rubber and has a hollow interior for receiving a pneumatic or hydraulic fluid.

Rigid steel tubes 309 and 310 and further rigid steel tubes (not shown) spaced along the bottom of the basket 301 link the two sides 302 and 303. A central clamp, generally identified by reference numeral 311, is fixed to the center of the rigid steel tube 309 by solid steel plates 312, 313. The central clamp 311 is also fixed to the other rigid steel tubes 310 and (not shown) using similar steel plates (not shown). The central clamp 311 comprises a housing 314, which extends substantially the entire length of the basket 301. The housing 314 is arranged to be parallel to the C-shape rails 305 and 306. The housing 314 may extend from the mouth of the basket and slightly further than the C-shape side rails 305 and 306. The outer housing 314 has two sidewalls 315 and 316 welded to a bottom plate 316a. Each of the two sidewalls 315 and 316 has an upper portion 317 and 318 folded at right angles to form a shoulders and a slot 319 therebetween. The shoulders are located at the same level as the bottom of the C-shape rails 305 and 306, but may be at a level which is slightly higher (may be up to 10 mm, but preferably no more than 5 mm) or slightly lower (may be up to 10 mm, but preferably no more than 5 mm). A plate 320 extends substantially the entire length of the housing 314 within the housing 314. The plate 320 has opposing sides 321 and 322. Each side 321 and 322 is castellated (only two shown 321a and 322a). The tops of the castellations 321a, 322a on each side 321 and 322 are welded to the sidewalls 315 and 316 respectively, to form spaces (only two shown 321b and 322b) between adjacent castellations.

An inner housing 323 is arranged in the housing 314 and extends upwardly through the slot 319. Parts of the inner housing 323 are shown in FIGS. 3B to 3E. The inner housing 323 comprises a bottom plate 324, a body 325, a neck 326 and a top 327. The body 325 comprises a top plate 328 and two side plates 329 and 330. The side plates 329 and 330 may be welded to the top plate 328 or formed integrally with the top plate 328. The side plates 329 and 330 have castellations 331 and recesses 332 therebetween, as shown in FIG. 3C. The bottom plate extends substantially the entire length of the housing 314 and is welded to the castellations 331. The neck 326 extends from the center of the top plate 328 and has a top 327 arranged thereon to form a T-bar. The top 327 may be welded or formed integrally with the neck and the neck may be welded or formed integrally with the top plate 328. The neck 326 has a portion 333 locate near an end 334 of the top plate 328 which is not provided with a top and is chamfered. There is a ledge 335 provided at the end 334. The top 327 extends from the top of the chamfered portion 331 to a rear end 336 of the top plate 328. The top 327 is provided with an arrow head portion 341. The body 325 has an opening 337 for receiving a hose 338.

Referring back to FIG. 3, the castellations 331 in the body 325 of the inner housing 323 are vertically slideably arranged in the spaces 321b and 322b formed between the plate 320, the castellations 321a and 322b and the respective sidewalls 321 and 322 of the housing 314. The neck 326 is vertically slideably arranged in the slot 319 in the housing 314. An inflatable bladder 339 is fixed to the bottom face of the plate 320 and is linked to the hose 338. Return springs (340, only one shown) are spaced along the length of the central clamp 314 between the bottom plate 324 of the inner housing 323 and the bottom plate 316a of the outer housing 314.

Referring to FIGS. 3F to 3K, the screen assembly 400 comprises a panel 401 made from steel, aluminum or plastics material having a plurality of triangular apertures 402 between two imperforate side areas 403 and (not shown). A layer of screening material 404, such as wire mesh is adhered to the panel 401 using a hot melt glue, powder adhesive, staples, sewing material or other means. The layer of screening material 404 may comprise one, two or three more layers of wire mesh. The panel 401 is welded to a plurality of elements to form a support 405. Although, the support 405 may at least partly be made integrally with the panel 401 by folding portions of the panel 401, as disclosed in PCT Publication No. WO 01/76719 and herein above with reference to FIG. 3G. The plurality of elements comprises two side strips 406 and 407 which are welded to sides of the panel 401. A rear end 408 of the panel 401 has a strip of steel 410 welded thereto which has a bottom portion folded inwardly and downwardly to form a lip 409 for abutting another screen assembly provided with a lap. A front end 411 of the panel 401 has a strip of steel 412 welded thereto and has a bottom portion folded outwardly and folded back on itself to form a lap 413. A plurality of ribs 414 arranged between sides 406 and 407 are welded to the panel 401 and to the sides 406 and 407. Each rib 414 takes the form of a "lazy 7" which increases its rigidity. It is an aspect of the invention to have a screen assembly comprising at least one rib which is formed in the shape of a lazy 7 to increase the rigidity of the screen assembly. The ribs 414 may be arranged along solid parts of the panel 401, so that the apertures 402 are not obscured. A rail 416 is arranged along a central line of the screen assembly 400 in central recesses 415 in the ribs 414 and the strips of steel 410 and 412. The rail 416 is welded to the ribs 414 and strips of steel 410 and 412. The rail 416 is of uniform section and extends the entire length of the screen assembly 400. The rail 416 comprises a top 417, sides 418 and 419, each side having an inwardly and upwardly turning part forming a slot 420 and two shoulders 421 and 422. The shoulders 421 and 422 are flush with the bottoms of the ribs 414 and the steel strips 410 and 412. It should be noted that, it is preferred that the top 417 of the rail 416 is spaced from the panel 401, such that, in use, material filtered through the layers of screening material 404 and the apertures 405 in the panel 401 is substantially unobstructed and passes around the rail 416 and into a sump therebeneath.

Referring now to FIGS. 3L and 3M, in use, the front end of the slot 420 of the rail 416 of the screen assembly 400 is located over the chamfered neck 333 of the central clamp 311 and the sides 406 and 407 of the screen assembly 400 are located in the C-shape rails 306 and 307. The screen assembly 400 is slid on to the T-bar 326, 327 and into the C-shape rails 305 and 306 until the front of the screen assembly 411 abuts a preceding screen assembly or the end fitting of the shale shaker 400. A second, third, fourth and fifth screen assembly may be slid into the shale shaker 300 behind the first screen assembly 400 depending on the size of the shale shaker and the size of the screen assemblies, or in separate sets of C-shape rails provided on separate levels of the shale shaker, such as in Varco Brandt VSM 300 or KING COBRA shale shakers. Once the screen assemblies are in place, the inflatable bladders 307, 308 and 339 are inflated. The bladders 307, 308 and 339 may be inflated simultaneously or one after the other. The sides of the screen assembly 403 are pushed down on to the bottom of the C-shape rail 305 and 306 by inflation of the bladders 307 and 308 and the rail 416 and hence the center of the screen assembly is pulled down on to the shoulder 317 of the housing 314. It is preferred that the screen assembly and screening material thereon is now flat, although the screen assembly may be crowned or have an inverse crown. To remove the screen assemblies from the shale shaker, the bladders 307, 308 and 339 are deflated. Bladders 307 and 308 release the sides of the screen assembly 400. Return springs 340 are biased to expand and push the inner housing 323 upwardly in the outer housing 314 pushing the T-rail up and releasing engagement with the rail 416 in the screen assembly 400.

Figure 4:
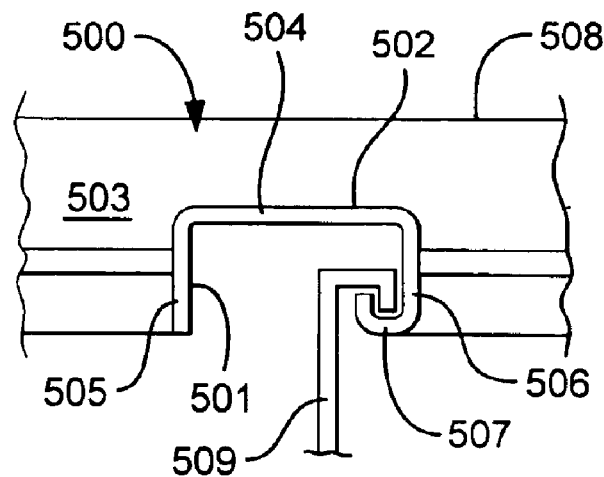
FIG. 4 is a scrap rear end view of part of a further embodiment of a screen assembly according to the present invention, shown with a hook rail of a central clamp of a vibratory separator.
Figure 5:
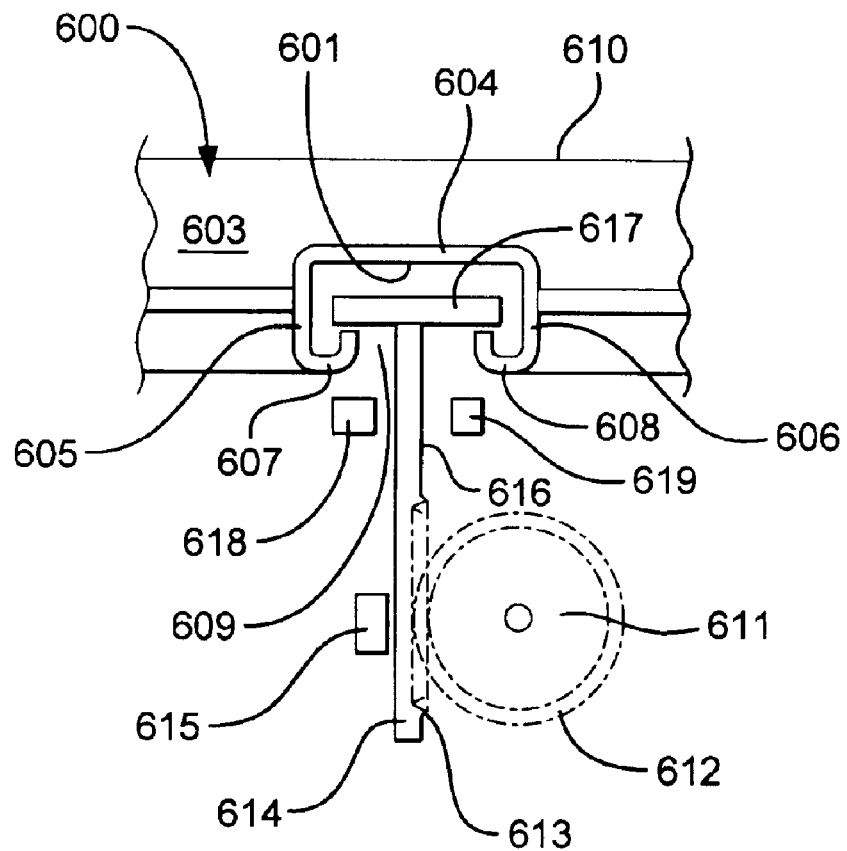
FIG. 5 is a scrap rear end view of a part of a further embodiment of a screen assembly in accordance with the present invention, shown with an alternative central clamp.

FIG. 4 shows an alternative embodiment of a screen assembly 500 and an alternative part of a central clamp (not shown in full), which may be the central clamp of FIG. 3 or FIG. 5. A rail 501 is arranged along a central line of the screen assembly 500 in central recesses 502 in ribs and the strips of steel 503 (and not shown). The rail 501 is welded to the ribs and strips of steel 503 (and not shown). The rail 501 is of uniform section and extends the entire length of the screen assembly 500. The rail 501 comprises a top 504, sides 505 and 506, one side having an inwardly and upwardly turning part 507 which is along the central line of the screen assembly, forming a hook a shoulder. The shoulder is flush with the bottoms of the ribs and the steel strips 503. It should be noted that, it is preferred that the top 504 of the rail 501 is spaced from an apertured panel 508, such that, in use, material filtered through the layers of screening material (not shown) and the apertured panel 508 is substantially unobstructed and passes around the rail 501 and into a sump therebeneath. A hook rail 509 of the central clamp, is shown engaged with the rail 501 for pulling the rail 501 and hence a central part of the screen assembly down to fix the screen assembly in place in the vibratory separator.

FIG. 5 shows an alternative for of a screen assembly 600 and an alternative part of a central clamp (not shown in full). A rail 601 is arranged along a central line of the screen assembly 600 in central recesses 602 in ribs (not shown) and the strips of steel 603 and (not shown). The rail 601 is welded to the ribs and strips of steel 603 and (not shown). The rail 601 is of uniform section and extends the entire length of the screen assembly 600. The rail 601 comprises a top 604, sides 605 and 606, each side having an inwardly and upwardly turning part 607 and 608 forming two shoulders and a slot 609. The shoulders 607 and 608 are flush with the bottoms of the ribs and the steel strips 603. It should be noted that, it is preferred that the top 604 of the rail 601 is spaced from an apertured panel 610 arranged on the ribs and steel strips 603, such that, in use, material filtered through the layers of screening material (not shown) thereon and the apertured panel 610 is substantially unobstructed and passes around the rail 601 and into a sump therebeneath. The central clamp comprises a gear wheel 611 attached to a motor (not shown), which may be electric, hydraulic or pneumatic, which turns the gear wheel. The gear wheel has teeth 612 which mesh with teeth 613 provided on a vertical member 614 held in a guide 615. The vertical member 614 has a neck 616 formed integrally with a T-bar rail 617, which engages with the rail 601. The neck 616 is located in a guide comprising shoulders 618 and 619. In use, the screen assembly 600 is arranged in the vibratory separator as described with reference to FIG. 3. The central clamp is operated by activating the motor (not shown), which turns the gear wheel 611 anticlockwise to pull the T-bar rail 617 downwardly. The shoulders 607 and 608 of the rail 601 abut the shoulders 618 and 619 to fix the screen assembly 600 in the vibratory separator. It is envisaged that the basket, solid steel plates and rigid steel tubes could be made from any other suitable material, such as aluminum, carbon fibre, steel.

It is envisaged that the bladders may be inflated with a hydraulic fluid or a part pneumatic, part hydraulic system. It is also envisaged that the C-shape rail 307 and 308 about the periphery of the basket may be replaced by a hook strip arrangement.

The central clamp may extend the entire length of the vibratory separator or may extend the length of each screen assembly.

Figure 6:
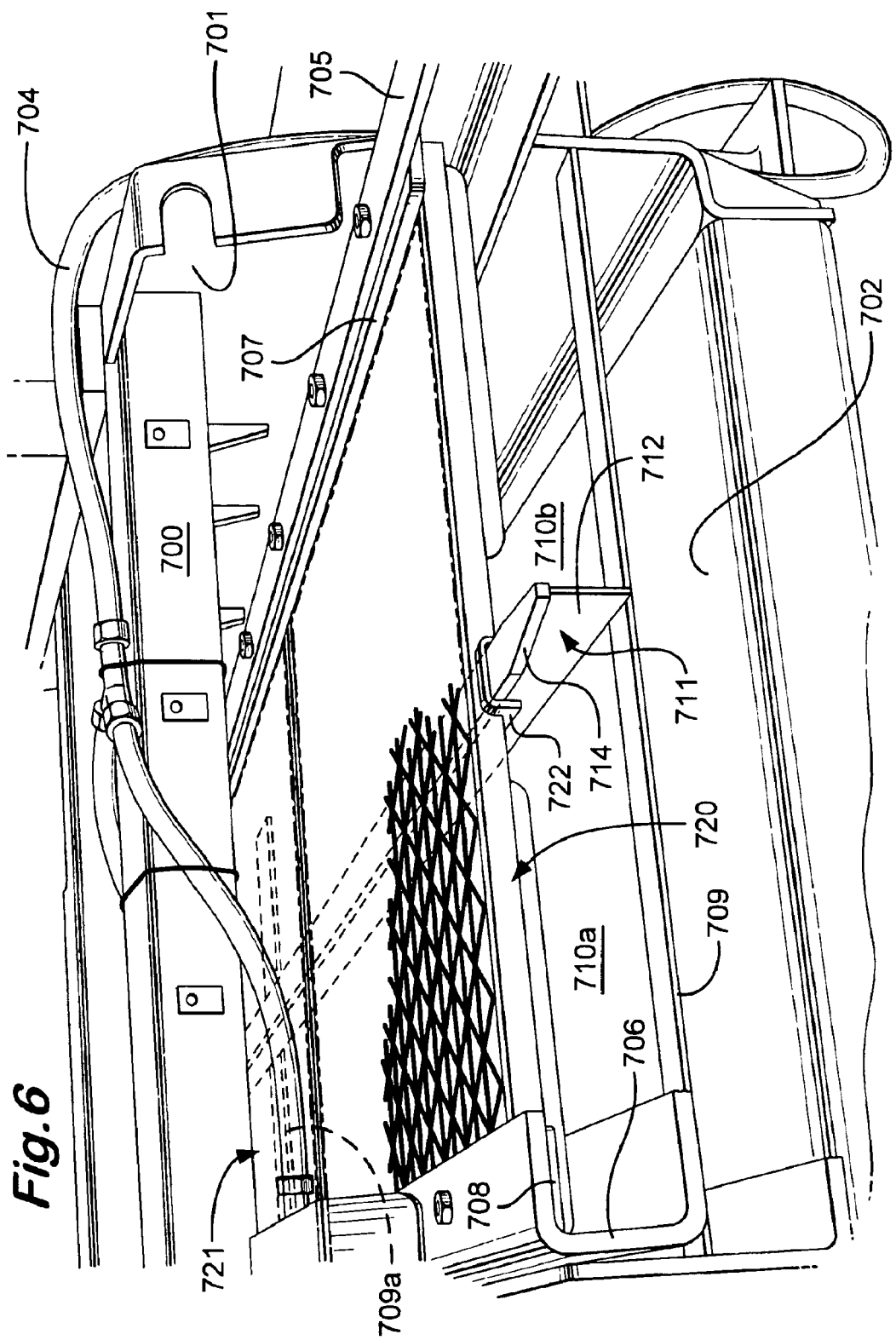
FIG. 6 is a perspective view of a shale shaker according to the present invention with screen assemblies according to the present invention.

FIG. 6 shows a shale shaker 700, like the shale shaker 300 described above, which has a basket 701 with an open bottom 704. Screen assemblies 720, 721 are located within rails 705, 706. Inflatable bladders 707, 708 are like the bladders 307, 308 described above. A central support 711 is mounted on a front support 709 and a similar rear support 709a beneath the screen assembly 721). Any suitable number of supports for the central support 711 may be used either at an angle to the central support of parallel with it and beneath it. Compressed air is supplied to the bladders 707, 708 via an air supply 704. Screened fluid flows through the screen assemblies 720, 721, through openings 709a, 709b, and then through the open bottom 704 into a typical receptacle or container.

The central support 711 has a base 712 and a top member 714. The top member 714 is positioned within a channel member 722 of the screen assembly 720 and also within a similar channel member (not shown) of the screen assembly 721.

Figure 7A:
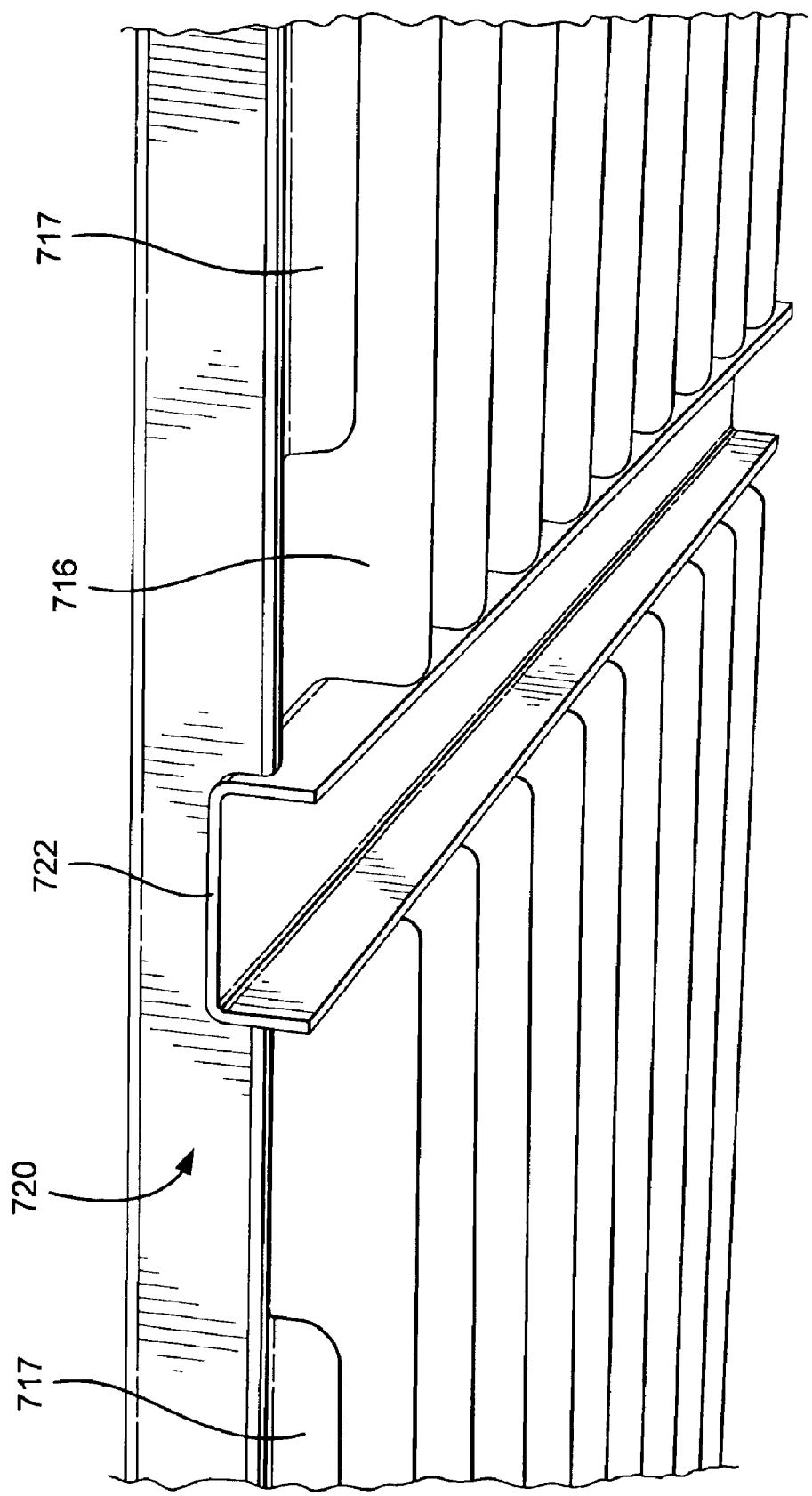
FIG. 7A is a lower perspective view of one of the screen assemblies of FIG. 6.

The screen assemblies 720, 721 are like the screen assembly 400, described above, but the channel member 722 has no in-turned edges or shoulders as does the screen assembly 400 so that the top member 714 easily slide into and out of the channel member 722 during screen installation and removal. Alternatively, a central support may be used with a suitably sized and configured top member to fit between shoulders like the shoulders 421, 422 of the screen assembly 400. Optionally the screen assemblies 720, 721 have a plurality of ribs 716 like the ribs 414, FIG. 3G. Front members 717 facilitate handling and manipulation of the screen assemblies. FIGS. 7C–7E show a channel member 722a similar to the channel member 722, FIG. 7A, in the screen assembly 720. The channel member 722a is formed by two spaced-apart members 722b, 722c which abut ends of ribs 716.

Figure 8A:
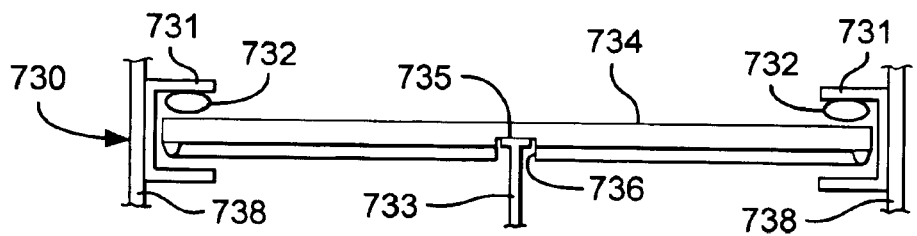
FIGS. 8A and 8B are schematic cross-section views showing steps in the operation of a vibratory separator or shale shaker and screen assembly according to the present invention.
Figure 8B:
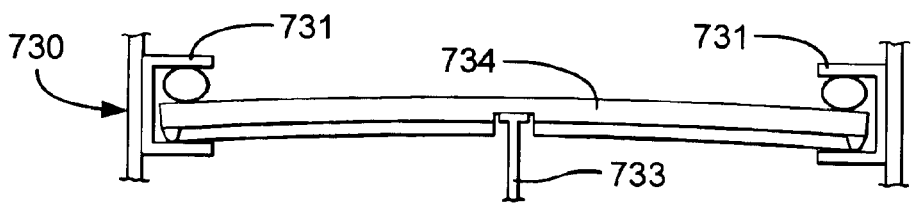

FIGS. 8A and 8B show steps in the installation of a screen assembly according to the present invention using a center support and side bladders of a vibratory separator or shale shaker. A shaker 730 (shown partially) has opposed channels 731 connected to basket side walls 738 from which are supported inflatable side bladders 732 and within which are positioned one or more screen assemblies like the screen assembly 734 (which can be any screen assembly according to the present invention). A central support 733 has a top member 735 (e.g., but not limited to, like the central supports of FIGS. 6, 15, and 16) positioned within a recess (or channel member) 736. Prior to inflation of the bladders 732 (FIG. 8A), the screen assembly is in its original non-installed condition, which may be generally flat. As shown FIG. 8B, upon inflation of the bladders 732, the sides of the screen assembly 734 are pushed down producing a "crowned" screen assembly with a mid-portion higher than the sides.

Figure 9A:
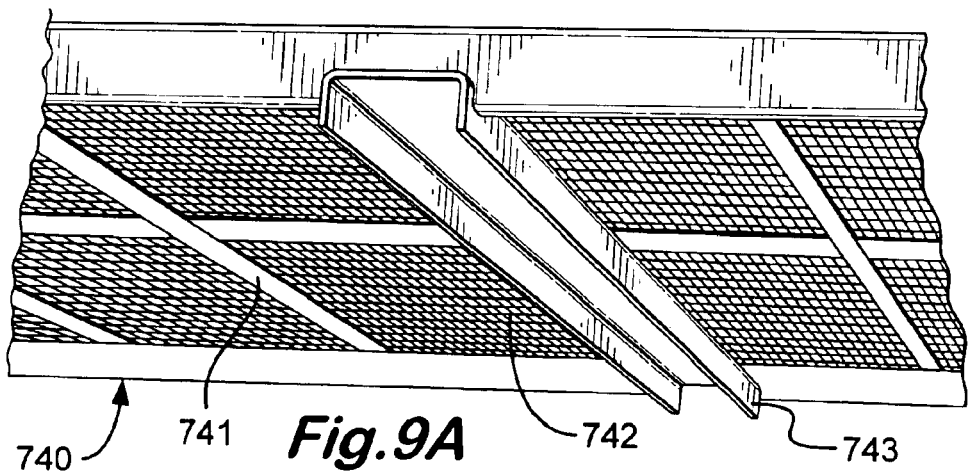
FIGS. 9A and 9B are lower perspective views of screen assemblies according to the present invention.

FIG. 9A shows a screen assembly 740 according to the present invention which is like the screen assemblies 400 and 720, but which has a support frame 741 formed of crossed members on which is mounted and/or secured screen mesh (one, two, three or more layers) 742. A central channel member 743 is like the channel member 722.

Figure 9B:
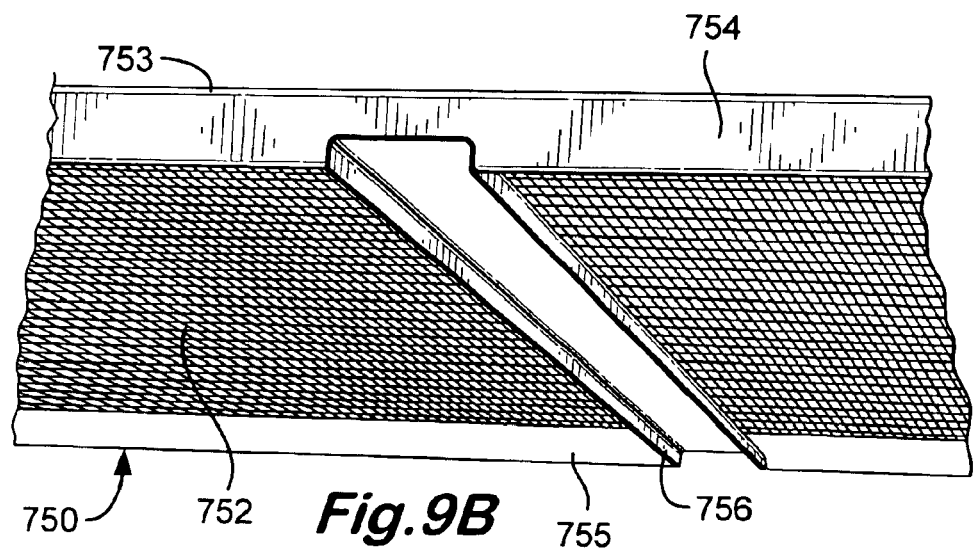

FIG. 9B shows a screen assembly 750 like the screen assembly 740 but which has one, two, three or more layers of mesh 752. In one aspect a lowermost mesh layer is a relatively coarse mesh, e.g. between 10 and 30 mesh. A peripheral four-sided frame 753 (two sides 754, 755 shown) encompasses the screen assembly 750. A channel member 756 is like the channel members 722, 743, but the lower edges of the channel member 756 do not project beneath the sides 754, 755.

Figure 10A:
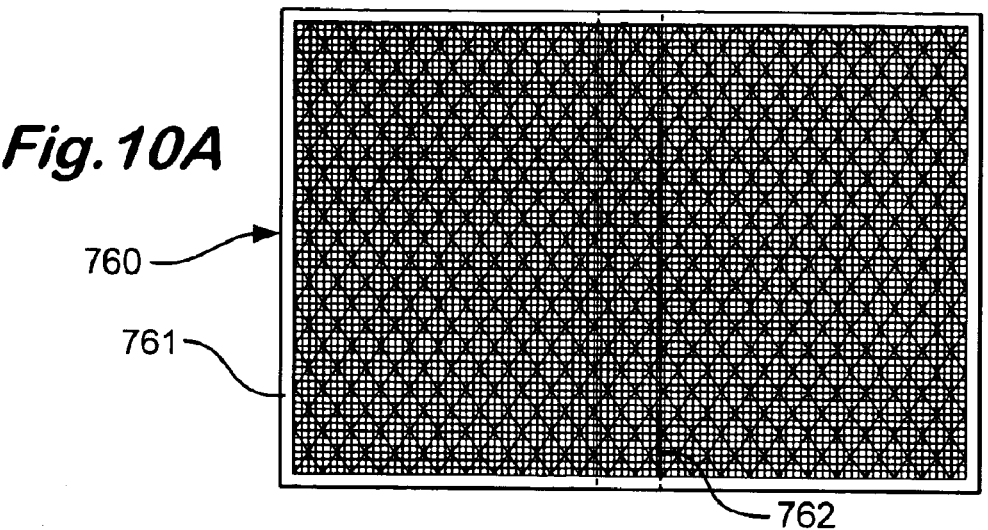
FIG. 10A is a top view and FIG. 10B is a front view of a screen assembly according to the present invention.
Figure 10B:
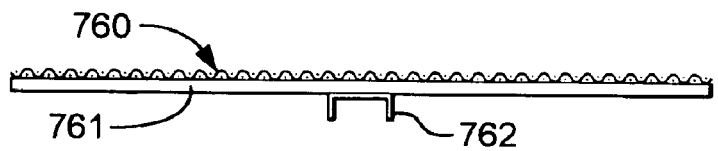

FIGS. 10A and 10B show screen assembly 760 according to the present invention which has an optional outer frame 761 and a central channel 762 that functions like the channel members 722, 743, and 756 in conjunction with a central support (e.g. but not limited to, central supports as in FIGS. 6, 8A, 15 and 16). In certain aspects the screen assembly 760 is produced with any of the systems disclosed in U.S. applications Ser. No. 09/517,212 filed Mar. 2, 2000; Ser. No. 10/037,474 filed Oct. 19, 2001; Ser. No. 09/454,722, filed Dec. 4, 1999 and Ser. No. 10/087,025 filed Oct. 19, 2001—all co-owned with the present invention and incorporated fully herein for all purposes.

Figures 11A, 11B:
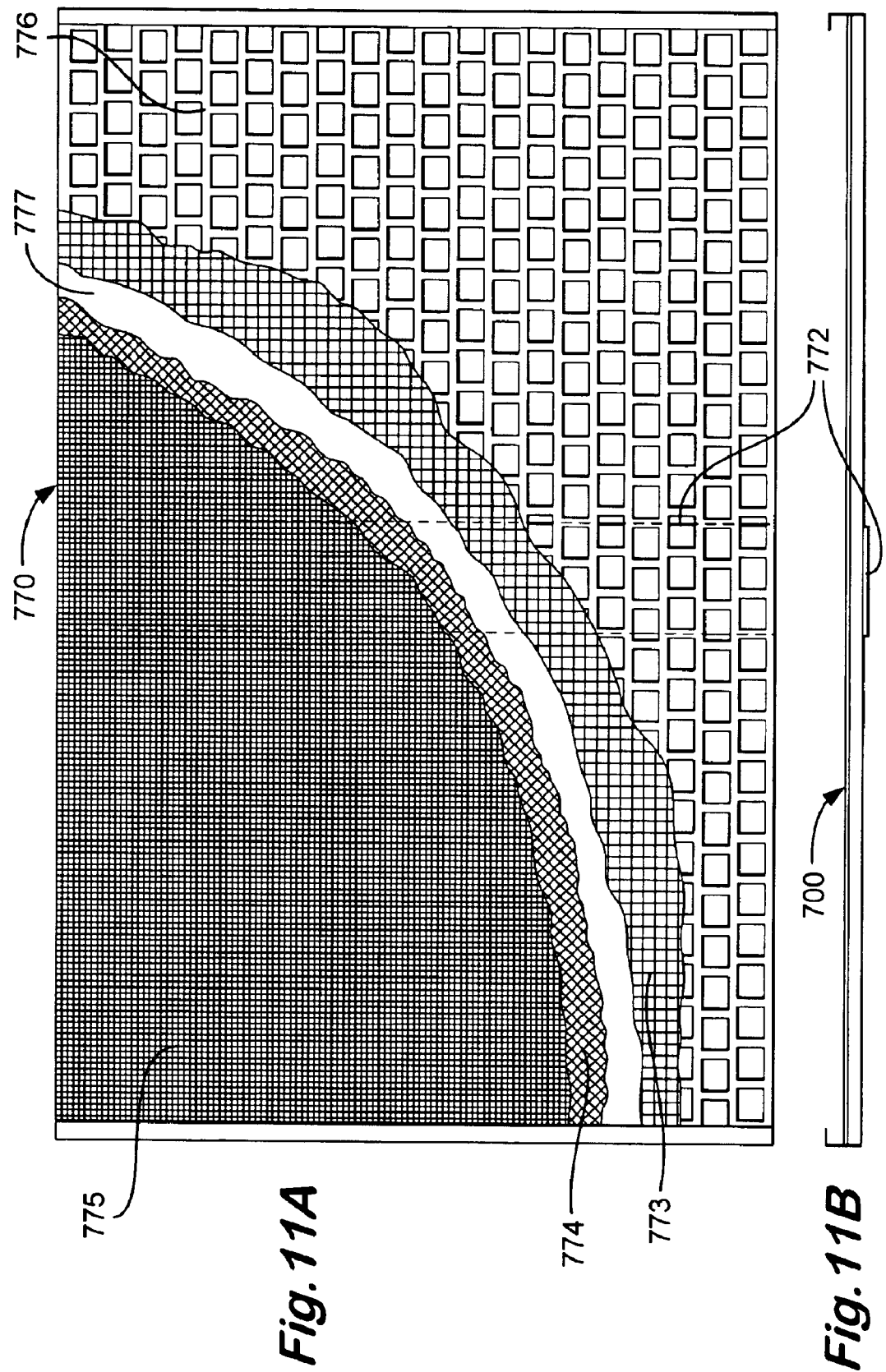
FIG. 11A is a top view and FIG. 11B is a front view of a screen assembly according to the present invention.

FIGS. 11A and 11B show a screen assembly 770 according to the present invention which has a central member 772 which is a flat piece of material (e.g. made of metal, plastic, fiberglass, composite, rubber, epoxy, urethane, polyurethane, wood) which is adhesively secured to the screen assembly 770; is formed integrally thereof, thereon, and/or therein; and/or is sewn, welded or sintered thereto. The central member 772 is positioned for contact by a top surface of a central support of a separator or shaker according to the present invention, including, but not limited to, central supports as shown in FIGS. 6, 8A, 15 and 16). The screen assembly 770 has a glue layer 777 produced with any of the systems in the applications listed in the preceding paragraph. The screen 770 is like screens disclosed in U.S. Pat. No. 4,575,421 (incorporated fully herein for all purposes), but made with one of the systems in the previously-listed applications. The screen 770 has three layers of mesh or screening material 773, 774 and 775 and a lower perforated plate 776. Any of the layers of mesh may be deleted and the glue 777 may be applied on top of any of the layers. In one aspect the plate 776 is deleted. In one aspect the plate 776 is deleted and any other support is used. The screen 770 is like a screen disclosed in U.S. Pat. No. Des. 366,040 (incorporated fully herein for all purposes) and U.S. Pat. No. 5,971,159 (incorporated fully herein for all purposes). Alternatively, the central member 772 is formed integrally of the screen assembly 770 and is, in certain aspects, an amount of epoxy, plastic, thermosetting or thermoplastic material. In one particular aspect the central member 772 is part of a plastic grid used to fuse together layers of screening material.

FIGS. 12A and 12B show a screen assembly 780 according to the present invention which is like screen assemblies in U.S. Pat. No. 4,575,421. The screen assembly 780 has a lowermost perforated metal plate 781 with a plurality of openings 789. The screen mesh layers include a coarse supporting screen 784, a fine screen 785, and a fine screen 786. Optional side bars 782 replace the channel-shaped members described in U.S. Pat. No. 4,575,421 (although it is within the scope of the present invention to have such channel-shaped members and use such a screen assembly as described in the method of FIGS. 8A–8B). Optionally, the side bars 782 may be hollow and/or flexible tubes. A central rod 787 is connected to or formed integrally of the screen assembly 780. The central rod 787 is positioned to contact a central support member of a separator or shaker according to the present invention (e.g., but not limited to, central supports as shown in FIGS. 6, 8A, 15 and 16). Any suitable material may be used for the rod 787 (as is true for the channel members and flat piece central member 772).

FIG. 12C shows a screen assembly 780*a*, like the screen assembly 780, but with a hollow central tube 788 instead of the solid rod 787. The tube 788 may be flexible or rigid.

FIGS. 13A and 13B show a screen assembly 780 according to the present invention like the screen assembly 780, FIG. 12A (like numerals indicate like parts) but with side rods 790*a* instead of side bars 782 and with a central flat piece 790*b* instead of the rod 787. In certain aspects the central flat piece is like the central member 772, FIG. 11A. Optionally, hollow and/or flexible tubes may be used for the side rods 790*a*.

Any layer of screening material in the screen assemblies 780, 790 may be deleted.

Figure 14B:
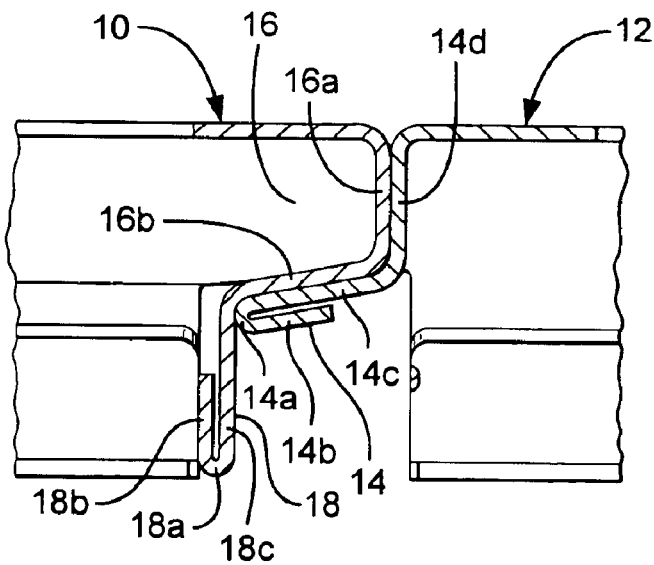
FIG. 14B is an enlargement of part of the screen assemblies of FIG. 14A.

FIGS. 14A–14B show abutting screen assemblies 10 and 12. The screen assemblies 10 and 12 have frames 30, 32 respectively with a plurality of optional cross supports 22, 23 respectively. Screening material on the frames 30 is shown schematically at 24, 26 respectively and it is to be understood that this is any known screening material.

Each screen 10, 12 has a tongue 14 projecting from one end that, as shown, is formed integrally of a portion of a frame 30, 32 respectively. Each screen 10, 12 also has an end 16 which is shaped and disposed for sealing contact with a tongue 14, as shown in detail in FIG. 14B. In the embodiments shown, a portion of the screen assemblies' frames is bent to form the end 16 and a lower portion 18.

The tongue 14 and/or the lower portion 18 may be formed by folding part of the frame back on itself. As shown in FIG. 14B a part 14*b* of a tongue 14 is folded over a part 14*c*, creating a rounded end part 14*a*. A part 18*b* of a lower portion 18 is folded over a part 18*c*, creating a rounded end part 18*a*.

FIG. 14B illustrates the sealing contact between the two screens 10 and 12. A part 14*d* of the screen assembly 12 sealingly contacts a part 16*a* of the screen assembly 10. An upper surface of the part 14*c* of the tongue 14 sealingly contacts a lower surface of a part 16*b* of the end 16. In certain aspects both of these sealing contacts are line contacts along substantially all of the ends of the adjacent screen assemblies.

In certain prior art devices when screen assemblies (which are prior art screen assemblies) as shown in FIGS. 14A and 14B abut each other and are clamped in place, the positive contact shown between portions 14*c* and 16*b* may or may not occur. When such screen assemblies are used in a method as described above (FIGS. 8A, 8B) the desired sealing contact between the portions 14*c* and 16*b* is facilitated and enhanced. Thus the present invention discloses a method for positioning a first screen assembly in abutting contact with a second screen assembly, the first screen assembly with a body with two opposed spaced-apart sides and a first end and a second end spaced-apart from the first end, the first end opposed to the second end, the body having a top and a bottom spaced-apart from the top, a tongue projecting from a location intermediate the top and the bottom of the first end of the body at a projection angle which is a non-perpendicular angle to the body, the tongue (in certain aspects, but not necessarily) formed of part of the body folded over on itself, the second end of the body having a projecting portion with a lower part configured and positioned for sealingly contacting a tongue like the tongue of the first end of an adjacent screen assembly, and the second end formed of part of the body, and the second screen assembly comprising a body with two opposed spaced-apart sides and a first end and a second end spaced-apart from the first end, the first end opposed to the second end, the body having a top and a bottom spaced-apart from the top, a tongue projecting from a location intermediate the top and the bottom of the first end of the body at a projection angle which is a non-perpendicular angle to the body, the tongue with a portion of the first tongue sealingly abutting a lower non-vertical surface of part of the second end formed of part of the body folded over on itself, the second end of the body having a projecting portion with a lower part configured and positioned for sealingly contacting a tongue like the tongue of the first end of an adjacent screen assembly, and the second end formed of part of the body, the method including moving the first screen assembly so that the first tongue sealingly contacts the second end.

Figure 15:
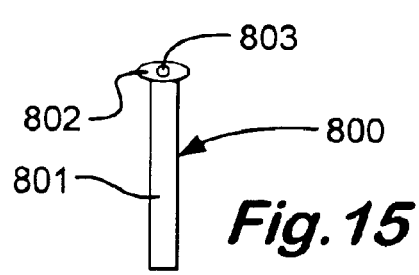
FIG. 15 is a front view of a screen support according to the present invention.

FIG. 15 shows a central support 800 according to the present invention for a separator or shaker that functions generally, e.g., as does the central support 711, FIG. 6 and the central support 733, FIG. 8A. The central support 800 has a base 801 and a top member 802 which is shown as having an elliptical cross-section, but which may have any desired cross-sectional shape, including, but not limited to, circular, square, rectangular, triangular or trapezoidal; and which may be solid or hollow and made of any material described above for central supports, central rods or central members. Alternatively, as is the case for all central supports, central rods, or central members according to the present invention, the top member 802 may have a central rigid member 803 along its length.

Figure 16:
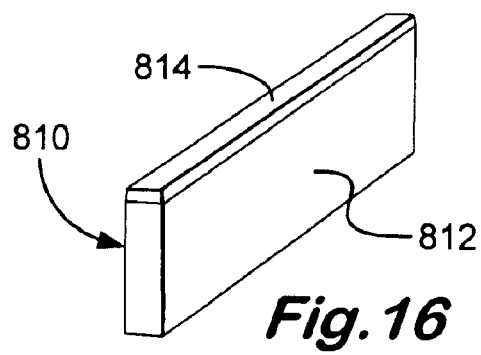
FIG. 16 is a perspective view of a screen support according to the present invention.

FIG. 16 shows a central support 810 for a separator or shaker according to the present invention which has a base 812 and a top member 814. The top member 814 is made of shock-absorbing material such as, but not limited to rubber, soft plastic, seal material, or gasket material. The central support 810 functions generally as do the central supports, etc. of FIGS. 6, 8A, and 15. When the supports of FIGS. 15 and 16 are used, as well as those disclosed above, the screen assembly need not have any channel member for receiving the central support or flat piece within or beneath screening material of a screen assembly, although such structures and pieces may prolong screen life depending on the material being treated by a separator or shaker.

The present invention, therefore, provides in some, but not necessarily all, embodiments, a vibratory separator having a basket with a first side spaced-apart from a second side, screen assembly apparatus mounted in the basket, the screen assembly apparatus having a central portion, a first screen side and a second screen side, central support apparatus connected to the basket and positioned beneath and in contact with the central portion of the screen assembly apparatus, and pressing apparatus on the first side and second side of the basket for pressing down on the first screen side and on the second screen side of the screen assembly apparatus so that the central portion of the screen assembly apparatus is higher than the first screen side and the second screen side. Such a vibratory separator may have one or some, in any possbile combination, of the following: wherein the pressing apparatus is selectively inflatable bladder apparatus; wherein the inflatable bladder apparatus is pneumatically or hydraulically operable; wherein the central support apparatus has a length substantially equal to the length of the screen assembly apparatus; wherein the screen assembly apparatus includes a channel member beneath the central portion thereof, the channel member for receiving part of the central support apparatus; wherein the vibratory separator is a shale shaker for treating drilling fluid material from an earth wellbore and the seal member is made of material able to withstand the drilling fluid material; wherein the basket has at least one beam linking the first side and said second side, the central support apparatus on the at least one beam; wherein the central support apparatus has a top part for contacting the central portion of the screen assembly apparatus, the top part made of shock-absorbing material; wherein the top part has a hollow portion; wherein the screen assembly apparatus includes a flat piece of material within, or connected to and beneath, the central portion of the screen assembly apparatus; wherein the screen assembly apparatus includes support apparatus for supporting screening material thereon, at least part of the central support apparatus contacting the support apparatus, and, in one aspect, the central support apparatus not in contact with the screening material; wherein the support apparatus for supporting the screening material is from the group consisting of frame, tubular members, strip support, and perforated plate; wherein the screen assembly apparatus includes a side member on each of the first screen side and the second screen side; and/or wherein the side members are from the group consisting of bar, rod, hookstrip apparatus, and tube.

The present invention, therefore, provides in some, but not necessarily all, embodiments, a vibratory separator having a basket with a first side spaced-apart from a second side, screen assembly apparatus mounted in the basket, the screen assembly apparatus having a central portion, a first screen side and a second screen side, central support apparatus connected to the basket and positioned beneath and in contact with the central portion of the screen assembly apparatus, pressing apparatus on the first side and second side of the basket for pressing down on the first screen side and on the second screen side of the screen assembly apparatus so that the central portion of the screen assembly apparatus is higher than the first screen side and the second screen side, wherein the pressing apparatus is selectivley inflatable bladder apparatus, wherein the central support apparatus has a length substantially equal to the length of the screen assembly apparatus, wherein the screen assembly apparatus includes a channel member beneath the central portion thereof, the channel member for receiving part of the central support apparatus, and wherein the screen assembly apparatus includes screening material support apparatus for supporting screening material thereon, at least part of the central support apparatus contacting the screening material support apparatus.

The present invention, therefore, provides in some, but not necessarily all, embodiments, a screen assembly for a vibratory separator, the screen assembly having a support and at least one layer of screening material on the support, wherein the screen assembly has a periphery and a central member within said periphery for contacting a central support of a vibratory separator, the central member within or connected to and beneath the at least one layer of screening material. Such a screen assembly may have one or some, in any possible combination, of the following: wherein the central member is a channel for receiving part of the central support; wherein the screen assembly has a length and the central support extends the length of the screen assembly; wherein the support is a panel having apertures therein; and/or wherein the panel has folded portions; wherein the support is from the group consisting of frame, tubular members, strip support, and perforated plate.

The present invention, therefore, provides in some, but not necessarily all, embodiments a method for installing a first screen assembly in a vibratory separator, the first screen assembly as any disclosed herein according to the present invention, the method including emplacing the first screen assembly over a central support of the vibratory separator, operating pressing apparatus of the vibratory separator to press down on two sides only of the first screen assembly so that its central part is higher than the two sides. Such a method may also include positioning a second screen assembly in abutting contact with the first screen assembly, the first screen assembly having a body with two opposed spaced-apart sides and a first end and a second end spaced-apart from the first end, the first end opposed to the second end, the body having a top and a bottom spaced-apart from the top, a tongue projecting from a location intermediate the top and the bottom of the first end of the body at a projection angle which is a non-perpendicular angle to the body, the tongue formed of part of the body folded over on itself, the second end of the body having a projecting portion with a lower part configured and positioned for sealingly contacting a tongue like the tongue of the first end of an adjacent screen assembly, and the second end formed of part of the body, and the second screen assembly having a body with two opposed spaced-apart sides and a first end and a second end spaced-apart from the first end, the first end opposed to the second end, the body having a top and a bottom spaced-apart from the top, a tongue projecting from a location intermediate the top and the bottom of the first end of the body at a projection angle which is a non-perpendicular angle to the body, the tongue formed of part of the body folded over on itself, the second end of the body having a projecting portion with a lower part configured and positioned for sealingly contacting a tongue like the tongue of the first end of an adjacent screen assembly, and the second end formed of part of the body, the method including: moving the first screen assembly to contact the second screen assembly; and pressing down on the sides of the first screen assembly so that the first tongue sealingly contacts the second end.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112.

The inventor may rely on the Doctrine of Equivalents to determine and assess the scope of their invention and of the claims that follow as they may pertain to apparatus not materially departing from, but outside of, the literal scope of the invention as set forth in the following claims. Any patent or patent application referred to herein is incorporated fully herein for all purposes.

What is claimed is:

1. A vibratory separator comprising
a basket with a first side spaced-apart from a second side,
screen assembly apparatus mounted in the basket, the screen assembly apparatus having a central portion, a first screen side and a second screen side,
vibrating apparatus connected to the basket,
central support apparatus connected to the basket and positioned beneath and in contact with the central portion of the screen assembly apparatus,
pressing apparatus on the first side and second side of the basket for pressing down on the first screen side and on the second screen side of the screen assembly apparatus so that the central portion of the screen assembly apparatus is higher than the first screen side and the second screen side,
wherein said pressing apparatus comprises inflatable bladder apparatus,
wherein said screen assembly apparatus has a length and said central support apparatus has a length substantially equal to said length of said screen assembly apparatus,
wherein said screen assembly apparatus includes a channel member beneath said central portion thereof, said channel member for receiving part of said central support apparatus, and
wherein said screen assembly apparatus includes screen support apparatus for supporting screening material thereon, at least part of said central support apparatus contacting said screen support apparatus.

2. A vibratory separator comprising
a basket with a first side spaced-apart from a second side,
screen assembly apparatus mounted in the basket, the screen assembly apparatus having a central portion, a first screen side and a second screen side,
vibrating apparatus connected to the basket,
central support apparatus connected to the basket and positioned beneath and in contact with the central portion of the screen assembly apparatus,
pressing apparatus on the first side and second side of the basket for pressing down on the first screen side and on the second screen side of the screen assembly apparatus so that the central portion of the screen assembly apparatus is higher than the first screen side and the second screen side, and
wherein said screen assembly apparatus includes a channel member beneath said central portion thereof, said channel member for receiving part of said central support apparatus.

3. The vibratory separator of claim 2 wherein said pressing apparatus comprises inflatable bladder apparatus.

4. The vibratory separator of claim 2 wherein said inflatable bladder apparatus is pneumatically operable.

5. The vibratory separator of claim 2 wherein said screen assembly apparatus has a length and said central support apparatus has a length substantially equal to said length of said screen assembly apparatus.

6. The vibratory separator of claim 2 wherein the vibratory separator is a shale shaker for treating drilling fluid material from an earth wellbore.

7. The vibratory separator of claim 2 wherein said basket comprises at least one beam linking said first side and said second side, said central support apparatus on said at least one beam.

8. The vibratory separator of claim 2 wherein the central support apparatus has a top part for contacting the central portion of the screen assembly apparatus, the top part made of shock-absorbing material.

9. The vibratory separator of claim 8 wherein said top part has a hollow portion.

10. The vibratory separator of claim 2 wherein said screen assembly apparatus includes a flat piece of material within or connected to and beneath said central portion of said screen assembly apparatus.

11. The vibratory separator of claim 2 wherein said screen assembly apparatus includes screen support apparatus for supporting screening material thereon, at least part of said central support apparatus contacting said screen support apparatus.

12. The vibratory separator of claim 2 wherein said screen assembly includes screen support apparatus from the group consisting of frame, tubular members, strip support, and perforated plate.

13. The vibratory separator of claim 2 wherein said screen assembly apparatus includes a side member on each of the first screen side and the second screen side.

14. The vibratory separator of claim 13 wherein said side member is from the group consisting of bar, rod, hookstrip apparatus, and tube.

15. A vibratory separator comprising
a basket with a first side spaced-apart from a second side,
screen assembly apparatus mounted in the basket, the screen assembly apparatus having a central portion, a first screen side and a second screen side,
vibrating apparatus connected to the basket,
central support apparatus connected to the basket and positioned beneath and in contact with the central portion of the screen assembly apparatus, and
pressing apparatus on the first side and second side of the basket for pressing down on the first screen side and on the second screen side of the screen assembly apparatus so that the central portion of the screen assembly apparatus is higher than the first screen side and the second screen side,
wherein the central support apparatus has a top part for contacting the central portion of the screen assembly apparatus, the top part made of shock-absorbing material, and
wherein said top part has a hollow portion.

* * * * *